(12) United States Patent
Fukaya et al.

(10) Patent No.: US 11,262,371 B2
(45) Date of Patent: Mar. 1, 2022

(54) AUTOMATIC ANALYZER AND AUTOMATIC ANALYSIS METHOD

(71) Applicant: Hitachi High-Technologies Corporation, Tokyo (JP)

(72) Inventors: Masashi Fukaya, Tokyo (JP); Shinji Azuma, Tokyo (JP); Takuya Takahashi, Tokyo (JP); Takumi Ito, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 424 days.

(21) Appl. No.: 16/465,764

(22) PCT Filed: Nov. 7, 2017

(86) PCT No.: PCT/JP2017/040023
§ 371 (c)(1),
(2) Date: May 31, 2019

(87) PCT Pub. No.: WO2018/110145
PCT Pub. Date: Jun. 21, 2018

(65) Prior Publication Data
US 2020/0072856 A1   Mar. 5, 2020

(30) Foreign Application Priority Data

Dec. 12, 2016 (JP) .............................. JP2016-240487

(51) Int. Cl.
*G01N 35/02* (2006.01)
*G01N 35/10* (2006.01)
(Continued)

(52) U.S. Cl.
CPC ........... *G01N 35/025* (2013.01); *G01N 35/10* (2013.01); *G01N 1/28* (2013.01); *G01N 2035/0437* (2013.01)

(58) Field of Classification Search
None
See application file for complete search history.

(56) References Cited

U.S. PATENT DOCUMENTS 5,948,358 A    9/1999  Saito
8,894,949 B2 * 11/2014  Inamura ............ G01N 35/1016
                                                   422/510
(Continued)

FOREIGN PATENT DOCUMENTS

JP      58-1162 U    1/1983
JP      64-6760 A    1/1989
(Continued)

OTHER PUBLICATIONS

International Search Report (PCT/ISA/210) issued in PCT Application No. PCT/JP2017/040023 dated Jan. 23, 2018 with English translation (five (5) pages).
(Continued)

*Primary Examiner* — Daniel S Larkin
(74) *Attorney, Agent, or Firm* — Crowell & Moring LLP

(57) ABSTRACT

An automatic analyzer controls a sequence including optical measurement and cleaning and includes a discharge mechanism including a discharge nozzle for discharging a liquid into a reaction vessel; and an overflow suction mechanism including an overflow suction nozzle for sucking an overflow amount of the liquid in the reaction vessel. In a liquid discharge step included in a cleaning process and interposed between a preceding step using a detergent and a succeeding blank value measurement step, the automatic analyzer establishes a first state where a lower end of the discharge nozzle is located in a height-wise lower part of the reaction vessel and a lower end of the overflow suction nozzle is located in an upper part of the reaction vessel, and provides control to carry out the discharge of liquid from the discharge nozzle (Continued)

and the suction of the overflow amount of liquid through the overflow suction nozzle.

13 Claims, 12 Drawing Sheets

(51) Int. Cl.
*G01N 1/28* (2006.01)
*G01N 35/04* (2006.01)

(56) References Cited

U.S. PATENT DOCUMENTS

| | | | |
|---|---|---|---|
| 2010/0000588 | A1 | 1/2010 | Tsuruta |
| 2010/0126536 | A1* | 5/2010 | Tsuruta .................. B01L 13/02 134/115 R |
| 2010/0254857 | A1 | 10/2010 | Mazume et al. |
| 2014/0199779 | A1 | 7/2014 | Yasui et al. |
| 2016/0339439 | A1* | 11/2016 | Shimizu ............. G01N 35/1011 |

FOREIGN PATENT DOCUMENTS

| | | |
|---|---|---|
| JP | 8-271531 A | 10/1996 |
| JP | 10-62431 A | 3/1998 |
| JP | 2000-321285 A | 11/2000 |
| JP | 2004-223352 A | 8/2004 |
| JP | 2008-224539 A | 9/2008 |
| JP | 2009-139238 A | 6/2009 |
| JP | 2012-88132 A | 5/2012 |
| JP | 2013-68540 A | 4/2013 |
| JP | 2015-81827 A | 4/2015 |

OTHER PUBLICATIONS

Japanese-language Written Opinion (PCT/ISA/237) issued in PCT Application No. PCT/JP2017/040023 dated Jan. 23, 2018 (five (5) pages).
Extended European Search Report issued in European Application No. 17881858.9 dated Oct. 15, 2020 (11 pages).

* cited by examiner

AUTOMATIC ANALYZER

FIG. 5
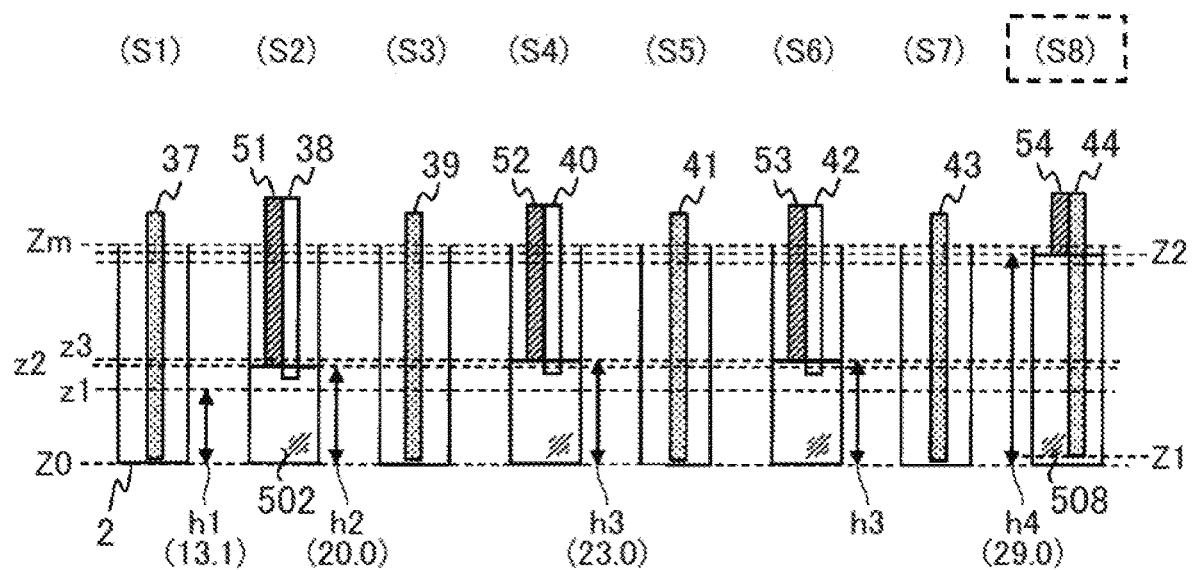
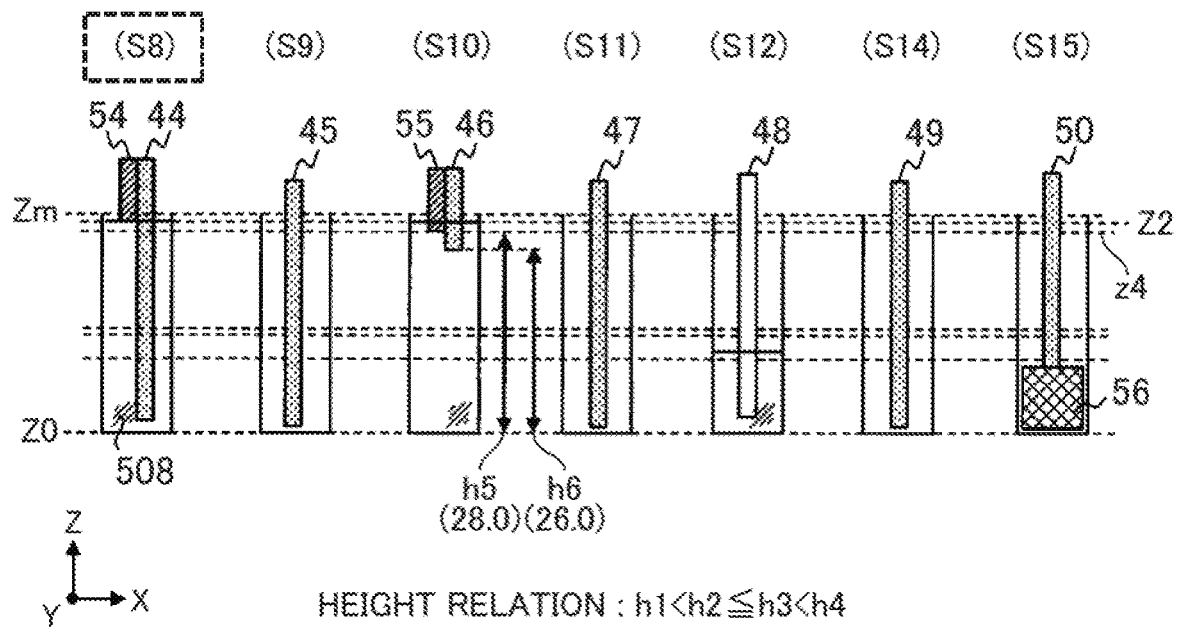
HEIGHT RELATION : h1<h2≦h3<h4

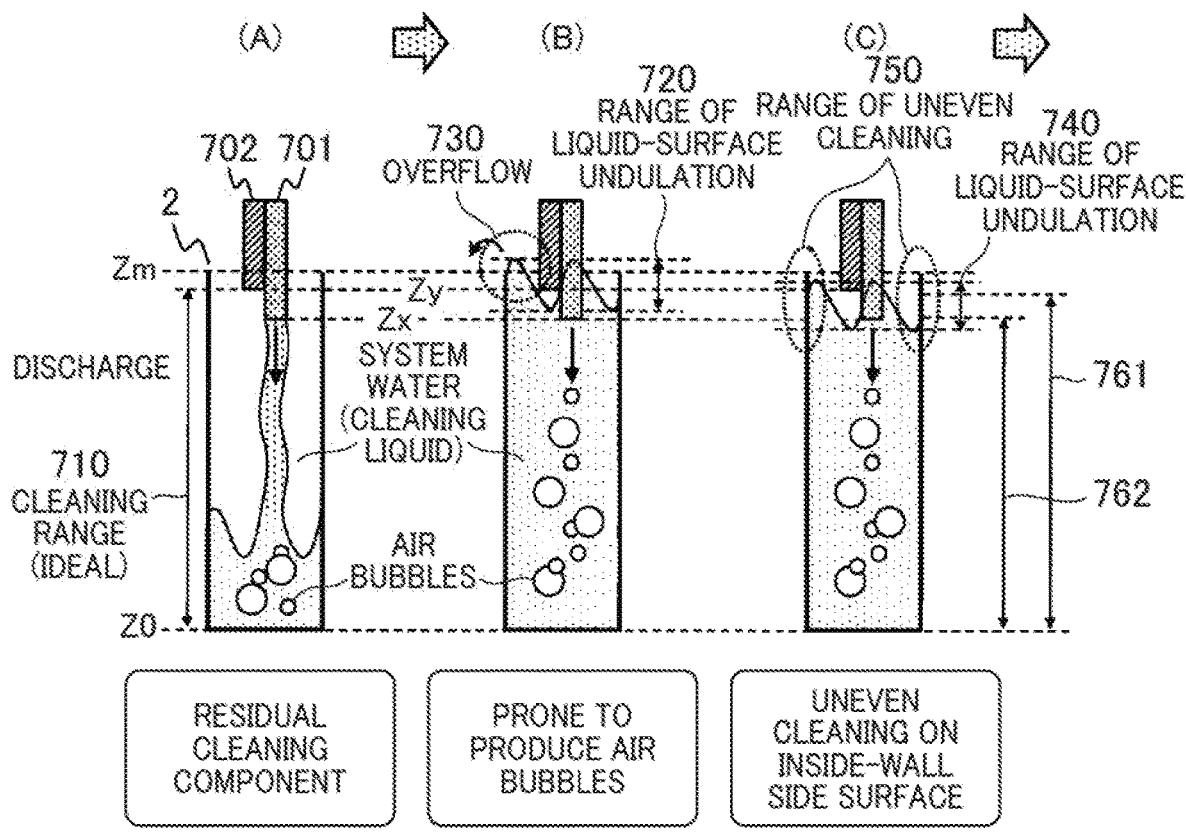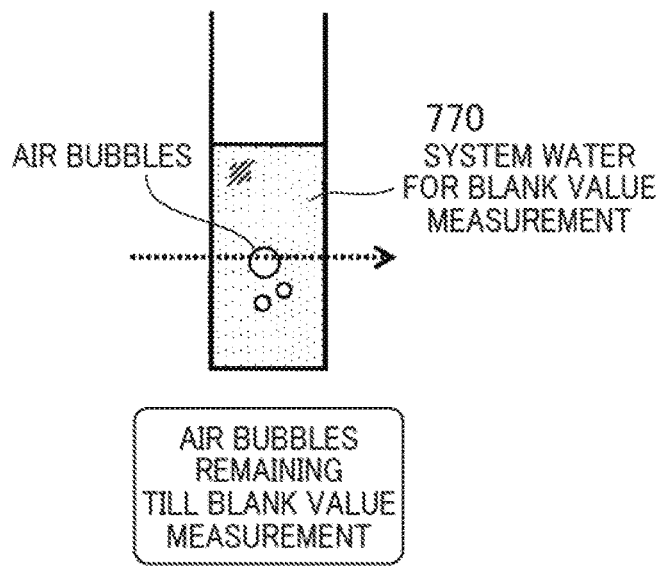
FIG. 7

AUTOMATIC ANALYZER AND AUTOMATIC ANALYSIS METHOD

TECHNICAL FIELD

The present invention relates to techniques of an automatic analyzer for determining optical measurement values such as concentration, activity value and the like of a target component in a sample including blood, urine and the like. Particularly, the invention relates to a technique for cleaning reaction vessels containing sample, reagent or the like for use in measurement.

BACKGROUND ART

The automatic analyzer analyzes a biological sample containing multiple components such as of blood, urine, spinal fluid and the like. The automatic analyzer prepares a reaction solution by dispensing a sample and a reagent from respective containers into a reaction vessel by means of a dispensing mechanism equipped with sample nozzle and reagent nozzle, followed by agitating a solution mixture of the sample and the reagent. Subsequently, the automatic analyzer takes measurement of change in color tone of the reaction solution by means of a photometer. Based on the resultant measurement data, the analyzer determines the quantity of a target material in the sample and outputs the result. In the automatic analyzer, the reaction vessels after the completion of analysis are cleaned with a detergent, cleaning liquid and the like by means of a reaction vessel cleaning mechanism (hereinafter, also described as "cleaning mechanism" sometimes). Thus, the reaction vessels are repeatedly used for analysis on the next time and thereafter.

In an optical measurement to acquire color change of a reaction solution of an analysis object, the automatic analyzer previously acquires an original color tone of the reaction vessel, or commonly measures an absorbance of the reaction vessel containing water therein in terms of blank absorbance (sometimes described as blank value or the like). The automatic analyzer evaluates the color tone of the reaction solution by subtracting the blank absorbance from the measured absorbance. In general, the blank absorbance can vary depending upon the frequency of use of the reaction vessel or the like. After the reaction vessel is cleaned, therefore, the blank absorbance of the cleaned reaction vessel is acquired in principle every time before the start of an analysis using the same. The automatic analyzer controls a sequence including the steps of cleaning the reaction vessel, rinsing the same, determining the blank value thereof and performing analysis including optical measurement.

Japanese Patent Application Laid-Open No. 2015-81827 (Patent Literature 1) is an example of the prior art related to the cleaning mechanism of the automatic analyzer. Patent Literature 1 states an object to improve the precision of analysis data and the following features. The automatic analyzer includes a reaction vessel so disposed as to present an inclined surface with respect to the vertical direction, and a dispensing probe including an opening mouth at an end thereof such as to suck and discharge liquid. The dispensing probe discharges the liquid from its opening mouth vertically downward to the inclined surface of the reaction vessel via an opening thereof.

CITATION LIST

Patent Literature

PTL 1: Japanese Patent Application Laid-Open No. 2015-81827

SUMMARY OF INVENTION

Technical Problem

A reaction vessel cleaning mechanism and its cleaning function of the automatic analyzer are required to ensure highly reliable cleaning effect and cleaning performance such that components of a reaction solution in each measurement are not carried over to the next measurement. For this reason, it is crucial to control a cleaning range in the reaction vessel which is cleaned with a detergent or a cleaning liquid, for example.

In the measurement of blank value, the automatic analyzer dispenses a liquid into the reaction vessel by using a nozzle of the cleaning mechanism. In a case where the inside of the reaction vessel is contaminated, a correct determination of the blank value cannot be achieved. Hence, a correct measurement of the change in color tone of the reaction solution cannot be taken during the analysis. As described above, the excellent cleaning performance of cleaning the inside of the reaction vessel and the correct measurement of blank value are essential factors for the automatic analyzer to maintain the reliability of analysis result.

The existing automatic analyzers include a system where the reaction vessel cleaning mechanism discharges the liquid into or sucks the liquid from the reaction vessel in a state where a lower end of a discharge nozzle or the like is located at a position in vicinity of a top side of the reaction vessel. In this system, the surface of a liquid in the reaction vessel is prone to undulate or ripple when the liquid is discharged in the vessel. Hence, the cleaning range in a heightwise upper part of the reaction vessel varies. This may affect the measurement value of blank absorbance taken using the reaction vessel in question. This also involves fear that the liquid may overflow from the top side of the reaction vessel. Further, a step using the detergent is followed by a step cleaning and rising the vessel with the cleaning liquid. In this step, the liquid in the reaction vessel is prone to produce air bubble due to the cleaning liquid discharged from the discharge nozzle in vicinity to the top side of the reaction vessel. If the air bubble remains in the reaction vessel, the measurement of the blank value may be affected.

As just described, the existing automatic analyzers have problems about the performance of cleaning the reaction vessels and performance of measuring the blank value in conjunction with the sequence including a cleaning step and analysis step, leaving room for improvement.

It is an object of the invention to provide techniques related to the cleaning mechanism of the automatic analyzer which can reduce the variations of the cleaning range in the reaction vessel and the influence on the measurement of blank value and the like and can maintain or enhance the cleaning performance and blank value measurement performance.

Solution to Problem

A typical embodiment of the invention is an automatic analyzer which has the following features.

According to an aspect of the invention for achieving the above object, an automatic analyzer equipped with functions to perform optical measurement and reaction vessel cleaning includes: a control unit for controlling a sequence including the optical measurement and the reaction vessel cleaning; a discharge mechanism including a discharge nozzle for discharging a liquid into the reaction vessel and operative to vertically move up and down the discharge nozzle and to discharge the liquid; and an overflow suction mechanism including an overflow suction nozzle for sucking an overflow amount of the liquid in the reaction vessel and operative to vertically move up and down the overflow suction nozzle and to suck the overflow amount of liquid, and has features wherein in a liquid discharge step which is included in a cleaning process preceding an optical measurement process and which is interposed between a preceding step using a detergent and a succeeding blank value measurement step, the control unit provides control so as to carry out the discharge of the liquid from the discharge nozzle and the suction of the overflow amount of liquid through the overflow suction nozzle when the analyzer is in a first state where a lower end of the discharge nozzle is located at a first position in a heightwise lower part of the reaction vessel by a downward movement of the discharge mechanism and a lower end of the overflow suction nozzle is located at a second position in a heightwise upper part of the reaction vessel by a downward movement of the overflow suction mechanism.

Advantageous Effects of Invention

According to the typical embodiment of the invention, the cleaning mechanism of the automatic analyzer is adapted to reduce the variations of the cleaning range in the upper part of the reaction vessel and influences on the blank value measurement and the like, and to maintain or enhance the cleaning performance and blank value measurement performance.

BRIEF DESCRIPTION OF DRAWINGS

FIG. 5 is a diagram of the automatic analyzer according to the first embodiment hereof, showing a height positional relation of nozzles and the like operating in the individual steps of the cleaning process;

FIG. 7 is a diagram of an automatic analyzer of a comparative example relative to the first embodiment hereof, illustrating problems concerning the discharge of system water in the step S8;

DESCRIPTION OF EMBODIMENTS

Figure 1:
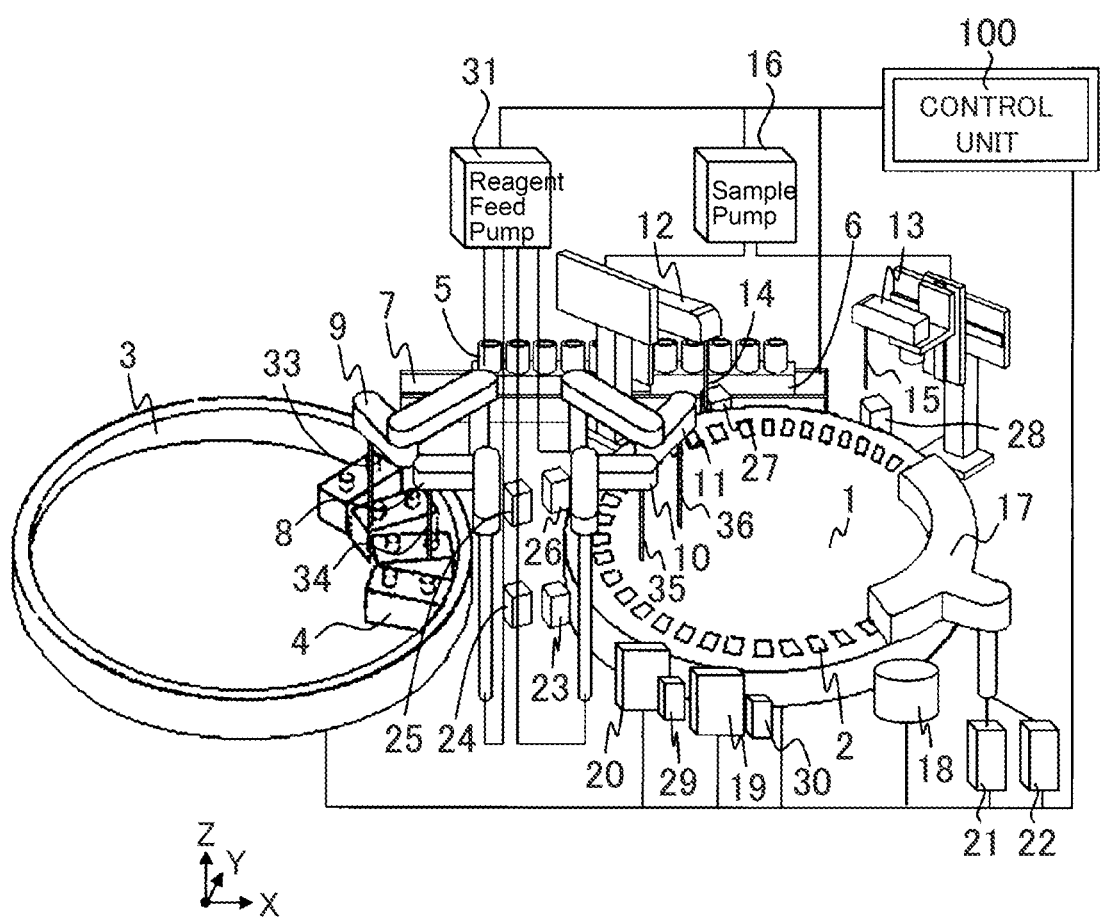
FIG. 1 is a diagram showing a structure of an automatic analyzer according to a first embodiment of the invention.

The embodiments of the invention will be described in detail as below with reference to the accompanying drawings. Throughout the figures illustrating the embodiments, equal or similar reference numerals are essentially assigned to equal or similar components, which are explained only once in most cases to avoid repetitions. It is noted that the directions and coordinate system herein are expressed by (X, Y, Z). X direction as a first direction means one direction of the horizontal directions. Y direction as a second direction means a horizontal direction perpendicular to the X direction. Z direction as a third direction means a vertical direction perpendicular to the X direction and the Y direction.

Problems

The above-described problems are more fully described. As to the cleaning of the reaction vessels in the automatic analyzer, consideration must be given not only to the range of contamination with the largest settable amount of reaction solution in the apparatus but also to contamination by scattered reaction solution when the sample or reagent is discharged or agitated. In the cleaning mechanism, the cleaning range must be defined in correspondence to an extent of the detergent or cleaning liquid delivery in the reaction vessel so that a wide area of contamination by scattered liquid and the like is considered. The cleaning liquid is a liquid such as a system water supplied by the apparatus. Generally speaking, it is desirable to expand the cleaning range as large as possible by raising the level of the cleaning liquid almost to an upper limit of an inside wall height of the reaction vessel. However, if the cleaning range is expanded almost to the upper limit of the inside wall of the vessel, the cleaning liquid may overflow from the top side of the reaction vessel. Therefore, the automatic analyzer must be configured and controlled such that the fear of overflow of the cleaning liquid from the top side of the vessel is eliminated while securing the sufficiently wide cleaning range.

A cleaning liquid discharge mechanism of the cleaning mechanism of the automatic analyzer includes: a discharge nozzle; a tube; a flow passage switching portion including a solenoid valve and the like; a flow rate regulating portion; a liquid feed pump; and the like. The cleaning mechanism is equipped with plural types of nozzles such as discharge nozzles and suction nozzles and a plural number of nozzles in each type such that nozzles of a different type are used for each step or use application. The cleaning mechanism is configured such that mechanisms for the respective steps are interconnected so as to share a part of the cleaning mechanism. For example, the plural discharge nozzles share the liquid feed pump or the like. Many of the automatic analyzers adopt the above-described configuration to share some component because of some advantages such as an installation area (downsizing) and equipment price (price reduction).

The solenoid valves respectively disposed in the flow passages of the discharge nozzles are controllably opened or closed with their respective timings. Pressure applied from the liquid feed pump to the respective discharge nozzles varies from moment to moment. Further, the cubic capacities of the individual reaction vessels may infinitesimally vary. This dictates the need for devising ways of exactly regulating the discharge rate of cleaning liquid from the respective discharge nozzles in order to minimize variability of cleaning ranges in the reaction vessels. Above all, such an ingenious attempt is of importance to the automatic analyzer having high processing capability such as an apparatus where a reaction disk has a short rotation period and the reaction vessel has a short stop time.

The following method can be adopted as a measure for minimizing the variations of the cleaning range and the like. That is, a suction nozzle (also described as "overflow suction nozzle" sometimes) for preventing overflow is disposed in vicinity to a discharge position of the discharge nozzle of the cleaning liquid. According to this method, when the cleaning liquid almost reaches the top side of the reaction vessel, the overflow nozzle is driven to suck an overflow amount of cleaning liquid so as to prevent the overflow of the liquid. Thus, the reachable level of the cleaning liquid or the cleaning range in a heightwise upper part of the reaction vessel can be controllably limited to the position of the overflow suction nozzle.

Even in the above method, however, there is a case where the level of the cleaning liquid instantaneously goes beyond the position of the overflow suction nozzle due to the undulation or ripple of the liquid surface during the discharge of the cleaning liquid. Particularly in the method where the cleaning liquid is discharged from a tip of the discharge nozzle disposed in vicinity to the top side of the reaction vessel, the discharged cleaning liquid is prone to scatter as hitting the inside wall of the reaction vessel. The cleaning range in the upper part of the reaction vessel is varied due to the undulation and the like of the liquid surface. The variations in cleaning range may affect blank value measurement. Therefore, it is necessary to design the heights of the discharge nozzle, the overflow suction nozzle and the like so as to ensure a certain degree of likelihood with respect to the height direction such that the cleaning liquid is prevented from overflowing from the top side of the reaction vessel. Specifically, a lower end of the nozzle is positioned at place in some degree downward from the top side of the reaction vessel and accordingly, the cleaning range is decreased in the height direction.

In addition to the above problem, the reaction vessel cleaning mechanism involves the following problem. In series of operations of the cleaning process, a step where the cleaning components remain involves fear that the liquid in the reaction vessel is prone to produce air bubble which may affect the measurement of blank value. This may lead to the degradation of optical measurement value.

A common flow of operations of the reaction vessel cleaning process is as follows. The cleaning process includes the steps of: (1) suction of reaction solution; (2) discharge and suction of detergent; (3) discharge and suction of system water; and the like. Basic cleaning and rinse are accomplished by performing each of the steps for a specified number of times. The cleaning process further includes the steps of: (4) discharge of system water for blank value measurement; (5) measurement of blank value; (6) suction of system water for blank value measurement; and (7) suction through tip, which are sequentially performed on the reaction vessel finished with the above cleaning and the like. The system water means purified water such as ion-exchange water that is introduced from an external device into the automatic analyzer through a flow passage and the like and used therein.

Particularly, the steps from the step (3) onward may encounter the following problem. If the detergent components (surfactant and the like) are carried over from the preceding step (2) and remain in the reaction vessel, the residual components tend to induce air bubble production by mixing with the system water. In a case where the system water for blank value measurement is dispensed into the reaction vessel where the air bubble remains, the measurement of blank value in the step (5) may be affected.

Patent Literature 1 (JP 2015-081827) discloses an example of the prior art related to a measure for preventing the production of air bubble when the liquid is discharged into the reaction vessel. According to the method of Patent Literature 1 (JP 2015-081827), the nozzle, the axis of which is inclined with respect to the axis of the reaction vessel, discharges water from above the reaction vessel so as to allow the water to run down the inside-wall side surface of the reaction vessel. Even in such a method, however, it is difficult to uniformize the cleaning range because the cleaning range in the upper part of the reaction vessel is prone to vary. Further, in a case where the air bubble occurs and adhere to the reaction vessel in this method, it is difficult to separate and remove the air bubble.

As described above, the automatic analyzer equipped with the reaction vessel cleaning mechanism, or more particularly, the analyzer equipped with a reaction disk mechanism and having the high processing capability has problems concerning the cleaning performance and the blank value measurement performance. It is desirable for this automatic analyzer to secure the large cleaning range in the reaction vessel by stabilizing the liquid surface with minimum undulation during the discharge of the cleaning liquid into the reaction vessel and to substantially uniformize the cleaning range. It is also desirable for this automatic analyzer to suppress the air bubble production or to reduce the residual air bubble during the discharge of the cleaning liquid into the reaction vessel so that the blank value measurement is not adversely affected.

First Embodiment

An automatic analyzer according to a first embodiment of the invention is described with reference to FIG. 1 to FIG. 12. The automatic analyzer of the first embodiment is equipped with a characteristic cleaning function. An automatic analysis method of the first embodiment is a method including steps performed by the automatic analyzer of the first embodiment.

Automatic Analyzer (1)

FIG. 1 shows a structure of the automatic analyzer according to the first embodiment hereof. The automatic analyzer includes: a control unit 100; a reaction disk 1; a reaction vessel 2; a reagent disk 3; a reagent bottle 4; a sample vessel 5; a rack 6; a sample transport mechanism 7; reagent dispensing mechanisms 8, 9, 10, 11; sample dispensing mechanisms 12, 13; sample dispensing nozzles 14, 15; a sample pump 16; a reaction vessel cleaning mechanism 17;

a spectrophotometer 18; agitation mechanisms 19, 20; a liquid feed pump 21; a vacuum suction pump 22; and cleaning tanks 23, 24, 25, 26, 27, 28, 29, 30.

The control unit 100 controls the whole automatic analyzer including the reaction vessel cleaning mechanism 17 and the whole sequence including cleaning and analysis processes. The individual mechanisms including the reaction vessel cleaning mechanism 17 are connected to the control unit 100. The control unit 10 and the individual parts are respectively interconnected by means of wiring. A variety of signals are sent and received between the control unit 100 and the individual parts such that operations of the individual steps including cleaning and analysis are controlled. The control unit 100 has a function as an analysis part which analyzes a sample in the reaction vessel 2 using measurement data from the spectrophotometer 18.

A plurality of reaction vessels 2 are arranged on a circle on the reaction disk 1. The reaction disk 5 is driven to rotate so that the individual reaction vessels 2 are circumferentially moved through unit rotation or through a distance for each cycle of the sequence, thus repeating move and stop.

A plurality of reagent bottles 4 are arranged on a circle inside the reagent disk 3. Disposed between the reaction disk 1 and the reagent disk 3 is the sample transport mechanism 7 for moving the rack 6 carrying the sample vessels 5 thereon. The sample vessel 5 contains a test sample such as blood or urine and is transported by the sample transport mechanism 7 as carried on the rack 6.

The reagent dispensing mechanisms 8, 9, 10, 11 are disposed between the reaction disk 1 and the reagent disk 3. Disposed between the reaction disk 1 and the sample transport mechanism 7 are the sample dispensing mechanisms 12, 13 which are capable of rotation, horizontal movement and vertical movement. The sample dispensing mechanisms 12, 13 respectively include the sample dispensing nozzle 14, 15. The sample dispensing nozzles 14, 15 are connected to the sample pump 16. The sample dispensing nozzle 14, 15 dispenses a sample from the sample vessel 5 to the reaction vessel 2 by making a rotational movement about a rotation axis and a horizontal movement of moving on a horizontal rail.

The reaction vessel cleaning mechanism 17, the spectrophotometer 18, the agitation mechanisms 19, 20, the reagent disk 3 and the sample transport mechanism 7 are arranged around the reaction disk 1. The reaction vessel cleaning mechanism 17 is a cleaning mechanism for the reaction vessels. The reaction vessel cleaning mechanism 17 is connected with the cleaning liquid feed pump 21 and the vacuum suction pump 22. The liquid feed pump 21 feeds the cleaning liquid to a discharge nozzle in charge of cleaning through a tubular flow passage and the like. The vacuum suction pump 22 sends a liquid by vacuum suction from a suction nozzle in charge of suction and through a tubular flow passage.

The reagent dispensing mechanisms 8 to 11, the sample dispensing mechanisms 12, 13, and the agitation mechanisms 19, 20 are respectively provided with the cleaning tanks 23 to 30 on the operating ranges thereof, the cleaning tanks constituting the cleaning mechanisms for cleaning individual parts such as the sample dispensing nozzles 14, 15. The reagent dispensing mechanisms 8 to 11 are connected with a reagent feed pump 31.

Next, description is made on analytic operations including optical measurement. The sample dispensing mechanism 12, 13 sucks a sample from the sample vessel 5 on the rack 6 by means of the sample nozzle 14, 15 and discharges the sample into the reaction vessel 2. The reagent dispensing mechanism 8 to 11 sucks a reagent from the reagent bottle 4 by means of a reagent nozzle 33 to 36 and discharges the reagent into the reaction vessel 2. The sample and reagent dispensed into the same reaction vessel 2 are agitated and mixed together by the agitation mechanism 19, 20 so as to make the reaction solution or a solution mixture. The reaction solution in the reaction vessel 2 concerned is subjected to optical measurement by the spectrophotometer 18. The spectrophotometer 18 determines an optical characteristic value such as spectrophotometric value. The reaction disk 1 rotates and stops in one cycle. A cycle time is 1.8 second, for example. A stop time of the reaction vessel 2 is 1 second. With each cycle the reaction vessel 2 as a measurement object passes in front of the spectrophotometer 18, the spectrophotometer 18 periodically takes optical measurement. After the lapse of a certain period of time, the control unit 100 analytically calculates the concentration or activity value of a target component in a sample based on the measurement results supplied by the spectrophotometer 18.

While the structure shown in FIG. 1 includes one reaction vessel cleaning mechanism 17, more than one reaction vessel cleaning mechanism 17 may be disposed according to the configuration of the reaction disk 1 and the like. The invention is not limited to the exemplary assembly configuration of FIG. 1 but may be assembled in various configurations.

Automatic Analyzer (2)

The automatic analyzer of the first embodiment has the following features. The automatic analyzer includes the mechanism which rotates a plurality of reaction vessels 2 arranged on the reaction disk 1. The automatic analyzer includes the reaction vessel cleaning mechanism 17 for cleaning the reaction vessels 2 for the purpose of repeated use of the reaction vessels 2. The reaction vessel cleaning mechanism 17 is provided with plural types of nozzles for the purposes of suction of the reaction solution, discharge and suction of the cleaning liquid, and the like. Each of the nozzle types include a plurality of nozzles. The individual nozzles are connected to the liquid feed pump 21 or the vacuum suction pump according to their respective roles, such as liquid discharge and liquid suction, via tube and the like. A controllable flow passage switching mechanism such as a solenoid valve is disposed on the tubular flow passage and at place between a nozzle connection portion and a pump connection portion. Along with the nozzles, the reaction vessel cleaning mechanism 17 moves up and down at place above the reaction vessels 2 repeating the move and stop as carried on the reaction disk 1. By doing so, the mechanism accesses to insert the individual nozzles into the individual reaction vessels 2. By means of the control unit 100, the automatic analyzer controls the sequence which includes the cleaning process including a series of steps of cleaning the reaction vessels 2.

Figure 2:
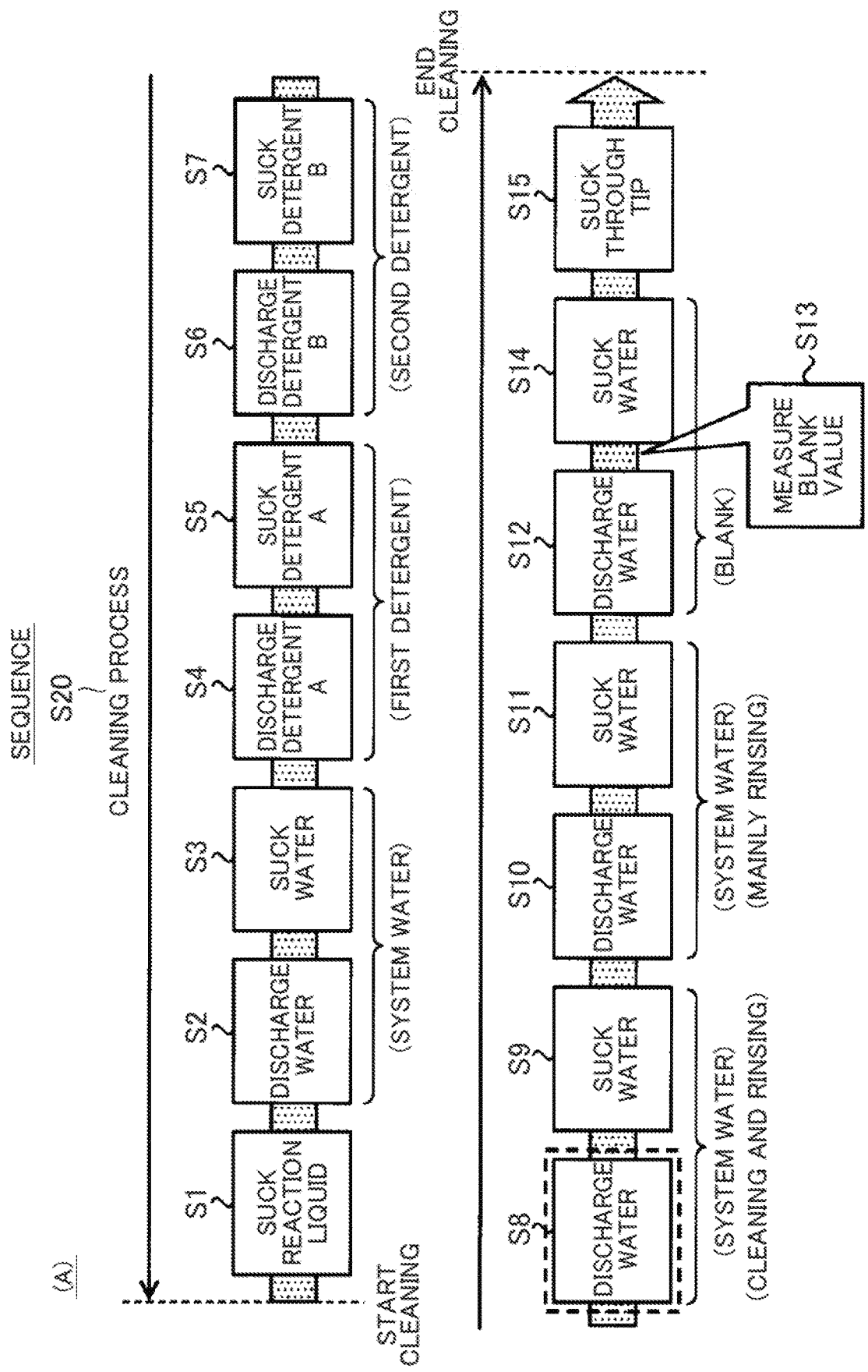
FIG. 2 is a diagram of the automatic analyzer according to the first embodiment hereof, schematically showing the operations of a sequence including a cleaning process using a reaction vessel cleaning mechanism.

During the operations of the cleaning process, the automatic analyzer of the first embodiment provides a characteristic control at a time when the above-described air bubble production is likely to occur or more particularly in a step to discharge the system water for cleaning and rinse (step S8 in FIG. 2 to be described hereinlater). The time when the air bubble production is likely to occur is when steps subsequent to steps to discharge and suck the detergent are performed. A surfactant component remaining in the reaction vessel 2 is prone to induce the air bubble production. In the step concerned, the automatic analyzer controls the cleaning mechanism (a system water discharge mechanism 400 in FIG. 4) such that a lower end (height position) of a discharge nozzle is located at a predetermined position in a lower part of the reaction vessel 2 and the discharge nozzle so located discharges the cleaning liquid downward. The height position of the discharge nozzle (position Z1 in FIG. 4) in this step is defined to be in the range of a predetermined ratios to the height of the inside wall of the reaction vessel (position Z0 to position Zb). In conventional examples, the lower end of the discharge nozzle is located at a relatively high position in the upper part of the reaction vessel. According to the first embodiment, the lower end of the discharge nozzle is located at the position Z1 in the lower part of the reaction vessel 2. The first embodiment provides a wider range for the discharge nozzle to be immersed in cleaning water than the conventional examples.

Further, the automatic analyzer of the first embodiment is configured to locate the overflow suction nozzle, as the cleaning mechanism, at an upper limit of the predetermined cleaning range with respect to the height of the inside wall of the reaction vessel 2 in the cleaning operation. A lower end of the overflow suction nozzle is located at place (position Z2 in FIG. 4) in vicinity to an opening in a top side of the reaction vessel. The position of the overflow suction nozzle is defined to be the highest position in all the steps of the cleaning process. The automatic analyzer controls the discharge amount of the cleaning liquid such that the level of the cleaning liquid discharged from the discharge nozzle reaches the position of the overflow suction nozzle. The automatic analyzer discharges the cleaning liquid so as to raise the liquid level from place near the bottom of the reaction vessel up to the position of the overflow suction nozzle at the top side of the vessel. By doing so, the undulation or ripple of the surface of the cleaning liquid being discharged is suppressed while the air bubble production is also prevented. Even in a case where the air bubble occurs, the separation or removal of the air bubble is promoted because the air bubble moves with the flow of the liquid to be sucked by the overflow suction nozzle.

After the completion of discharge of the cleaning liquid from the discharge nozzle, the automatic analyzer controls the operation of extracting the discharge nozzle and the like from inside of the reaction vessel by vertically upward movement. In this operation, the automatic analyzer controls the timing, speed and the like of the upward movement so as to minimize possible undulation and the like of the liquid surface. The automatic analyzer controls the rise speed of the mechanism in the extracting operation as follows. During a period when a tip of the discharge nozzle is immersed in the liquid, the mechanism is raised at a relatively lower speed. During a period after the tip of the discharge nozzle leaves the liquid surface, the mechanism is raised at a relatively higher speed. This is effective to obviate the fall and scattering of the cleaning liquid due to the wide immersion range of the discharge nozzle, and to uniformize the cleaning range.

Because of the characteristic control of the cleaning mechanism, as described above, the automatic analyzer of the first embodiment does not require a significant change in system configuration but can maintain or achieve higher cleaning performance and blank value measuring performance than the prior art.

Cleaning Process

FIG. 2 schematically shows the operations of the cleaning process for the reaction vessel 2 using the reaction vessel cleaning mechanism 17. Under the drive control by the control unit 100, the cleaning operations are performed according to a flow of a cleaning process S20 of FIG. 2 by rotating the reaction disk 1 and moving up and down the reaction vessel cleaning mechanism 17. The cleaning process S20 includes steps S1 to S15 in this order.

A step S1 is a step to suck the reaction solution in the reaction vessel 2. A step S2 is a step to discharge the system water in the reaction vessel 2. A step S3 is a step to suck out the system water from the reaction vessel 2. A step S4 is a step to discharge a detergent A (first detergent) into the reaction vessel 2. A step 5 is a step to suck out the detergent A from the reaction vessel 2. A step S6 is a step to discharge a detergent B (second detergent) into the reaction vessel 2. A step S7 is a step to suck out the detergent B from the reaction vessel 2. For example, the detergent A is an alkaline detergent and the detergent B is an acid detergent. The steps using these detergents provide options for determining what detergent to use, and the number of times to repeat the step based on an analysis object, analysis condition and the like. In some cases, only a step using one of these detergents is performed.

A step S8 is a step to discharge the system water into the reaction vessel 2. A step S9 is a step to suck out the system water from the reaction vessel 2. A step S10 is a step to discharge the system water into the reaction vessel 2. A step S11 is a step to suck out the system water from the reaction vessel 2. The steps S8 and S9 and the steps S10 and S11 are the steps to clean and rinse the inside of the reaction vessel 2 using the system water. The embodiment defines the cleaning and rinsing steps to be repeated twice. In the steps S8 and S9, the cleaning and rinse are performed by using the detergent components carried over from the previous step using the detergent and the system water discharged in the step S8. In steps S10 and S11, the rinse is principally performed using the system water discharged in the step S10. It is ideal that no detergent component remains after the step S11. It is noted that the height position of the nozzle differs between the steps S8 and S9 and the steps S10 and S11 (See FIG. 5 to be described hereinlater).

A step S12 is a step to discharge a system water for blank value measurement into the reaction vessel 2. A step S13 is a step to perform a photometric measurement of blank value in a state where the system water for blank value measurement is charged in the reaction vessel 2. A step S14 is a step to suck out the system water for blank value measurement from the reaction vessel 2. A step S15 is an additional suction step or in other words, a tip-suction step where additional suction is performed for totally removing the residual liquid such as the system water in the reaction vessel 2. The step S15 is performed using a mechanism including a suction nozzle having a predetermined suction tip (suction block) attached to a lower end thereof.

The reaction vessel 2 having gone through the cleaning process S20 (the step S15) is in a cleaned state and hence, is available for use in the next analysis process (including sample dispensing process, optical measurement process and the like).

Nozzles for Use in Cleaning Process

Figure 3:
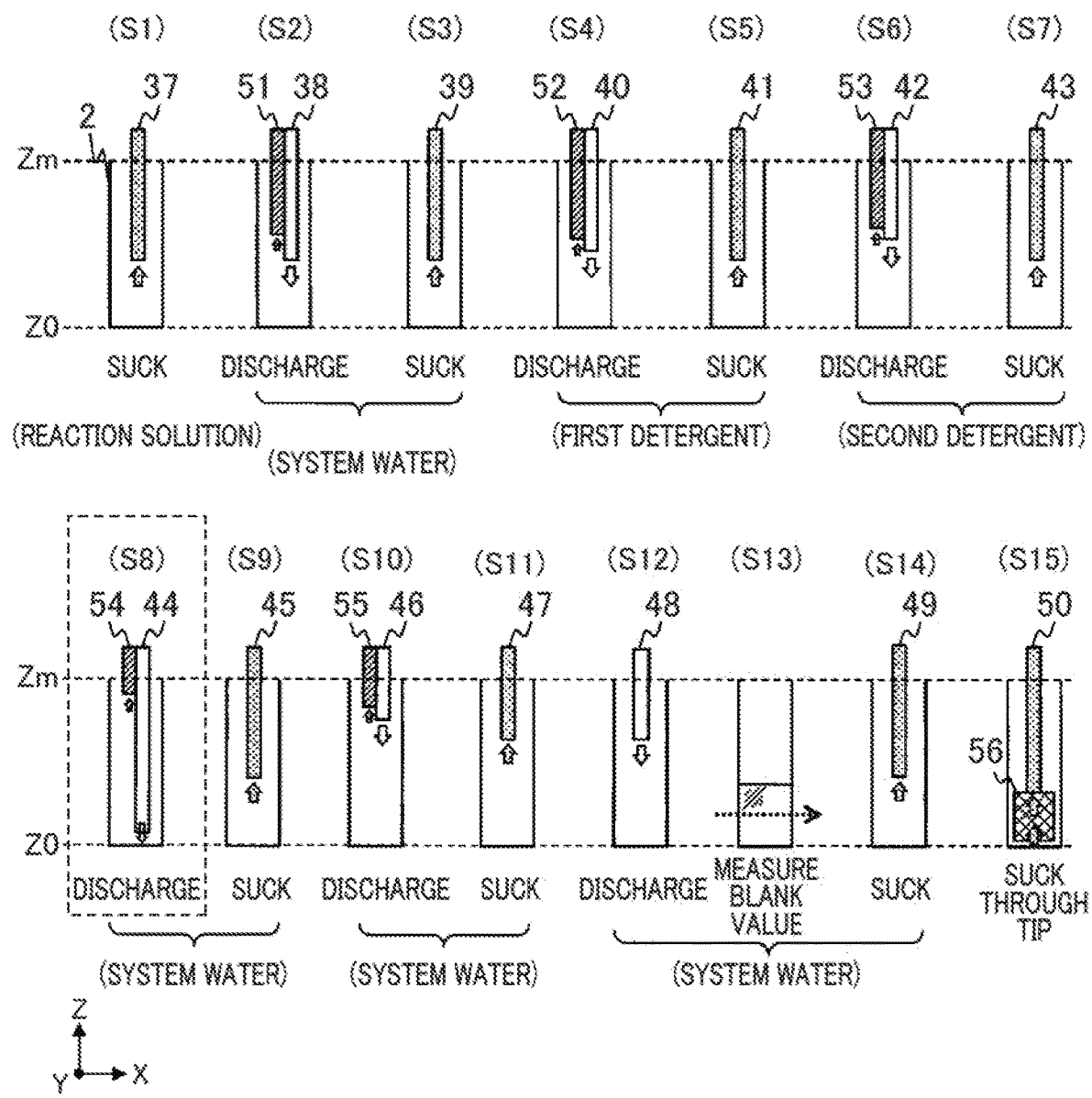
FIG. 3 is a diagram of the automatic analyzer according to the first embodiment hereof, showing configurations of nozzles and the like operating in individual steps of the cleaning process.

FIG. 3 schematically shows configurations of nozzles used in the respective steps of the cleaning process S20 shown in FIG. 2. The reaction vessel cleaning mechanism 17 is provided with plural types of nozzles and a plural number of nozzles in each type such as to play a role on a per-step basis. The nozzle types include at least the suction nozzle, the discharge nozzle, the overflow suction nozzle and the like. In each step, a different type of nozzles specialized in a role thereof are used. FIG. 3 shows the individual nozzles and the like partially inserted in the reaction vessels 2 on an XZ plane provided that the Z-direction positions Z0 of the inside wall bottoms of the reaction vessels 2 and the top side positions Zm of the reaction vessels 2 in the individual steps are aligned.

The nozzles for the individual steps are disposed at predetermined positions on a circle on the reaction disk 1. The nozzle is vertically moved to access the reaction vessel 2 delivered to the corresponding position on the circle by the rotation of the reaction disk. Although not shown in the figure, the nozzles have their Z-direction upper ends connected in common in the reaction vessel cleaning mechanism 17. Z-direction lower ends of the nozzles are so designed to have a predetermined positional relation (see FIG. 5 to be described hereinlater). The Z-direction upper ends of the nozzles are connected to the above-described tube, through which the nozzles are connected to the pump and the like as a common part. The solenoid valve, the flow rate regulating portion and the like are disposed on the flow passage between the nozzles and the pump.

The step S1 employs a reaction solution suction nozzle 37. The step S2 employs a system water discharge nozzle 38 and an overflow suction nozzle 51. The step S3 employs a cleaning liquid suction nozzle 39. The step S4 employs a detergent-A discharge nozzle 40 and an overflow suction nozzle 52. The step S5 employs a cleaning liquid suction nozzle 41. The step S6 employs a detergent-B discharge nozzle 42 and an overflow suction nozzle 53. The step S7 employs a cleaning liquid suction nozzle 43. The step S8 employs a system water discharge nozzle 44 and an overflow suction nozzle 54. The step S9 employs a cleaning liquid suction nozzle 45. The step S10 employs a system water discharge nozzle 46 and an overflow suction nozzle 55. The step S11 employs a cleaning liquid suction nozzle 47. The step S12 employs a blank-value measurement system water discharge nozzle 48. The step S13 employs the spectrophotometer 18 to perform the photometric measurement of blank value. The step S14 employs a blank-value measurement system water suction nozzle 49. The step S15 employs a suction nozzle 50 equipped with a suction tip 56 to perform tip-suction.

Mechanisms corresponding to the steps S2, S4, S6, S8, S10 as the step to discharge liquid are each provided with the discharge nozzle and the overflow suction nozzle. The discharge nozzle and the overflow suction nozzle as the two types of nozzles employed by these steps are configured to be coupled together and to be controlled to move up and down in unison. A distance and a height relation between the lower end of the discharge nozzle and the lower end of the overflow suction nozzle in each step are maintained constant. The overflow suction nozzle sucks an overflow amount of liquid overflowing from a predetermined position or above in order to prevent the overflow of the liquid from the top side (position Zm) of the reaction vessel 2.

In the automatic analyzer, the flow rate regulating portions for regulating the flow rates of the different types of liquids such as system water, detergent, and blank-value measurement system water, and solenoid valves are disposed on the flow passages, although not shown in the figures. The control unit 100 provides not only on-off control of the solenoid valves but also flow control of the different types of liquids. The system water discharge nozzles 38, 44, 46 share the flow rate regulating portion.

In the cleaning mechanism, a shock absorbing mechanism (not shown) is provided at the Z-direction upper ends of the nozzles. The shock absorbing mechanism acts to reduce impact force when a tip of the nozzle being moved downward in the Z-direction collides against the bottom of the reaction vessel 2. Therefore, it is ensured that no problem occurs even when the tip of the nozzle collides against the bottom of the reaction vessel 2.

The overflow suction nozzles for different steps are basically controlled to start a suction operation when the reaction vessel cleaning mechanism 17 moves down and to stop the suction operation when the reaction vessel cleaning mechanism 17 moves up.

Nozzle for Step S8

Figure 4:
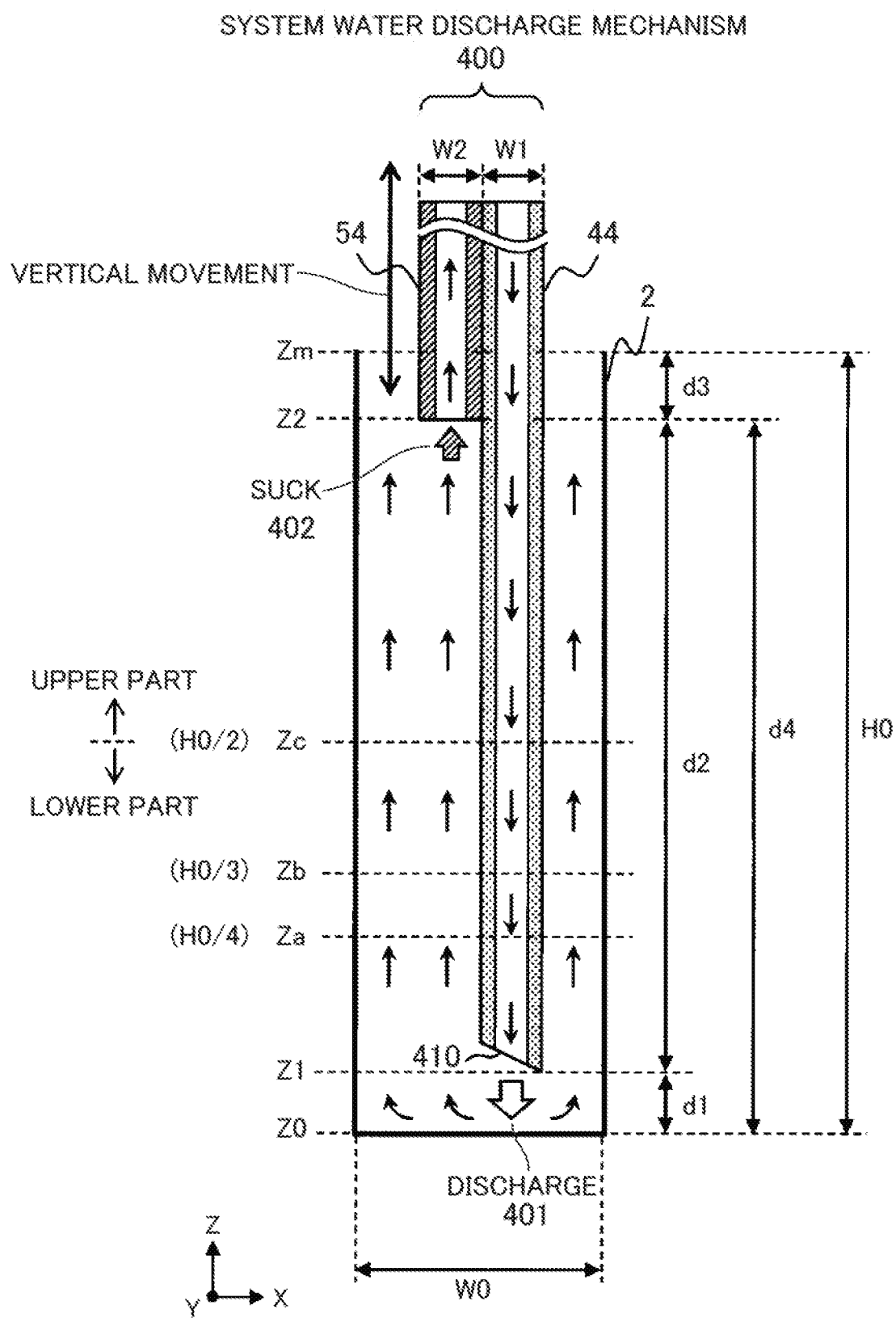
FIG. 4 is a diagram of the automatic analyzer according to the first embodiment hereof, showing a configuration of a system water discharge mechanism in a step S8.

FIG. 4 is a sectional view taken on the XZ plane, showing a configuration of a system water discharge mechanism 400 including nozzles for use in the step S8 as the system water discharge step. FIG. 4 shows a state where the nozzles are located at predetermined positions in the reaction vessel 2. The system water discharge mechanism 400 of the reaction vessel cleaning mechanism 17 includes the system water discharge nozzle 44 and the overflow suction nozzle 54. These nozzles have the coupled structure. "H0" is defined to mean a Z-direction height of the inside wall (a volume portion capable of containing liquid) of the reaction vessel 2. "W0" is defined to mean an X-direction width of the inside wall of the reaction vessel 2.

The insides of the system water discharge nozzle 44 and the overflow suction nozzle 54 define hollow flow passages extended in the Z direction. The Z-direction upper ends and lower ends of the system water discharge nozzle 44 and the overflow suction nozzle 54 define an opening mouth, respectively. The Z-direction upper ends of the system water discharge nozzle 44 and the overflow suction nozzle 54 are connected to the tube and the like via connecting components, respectively. Each of the tube ends is connected with the solenoid valve, the flow rate regulating portion, or the pump or the like via the connecting component. The system water discharge nozzle 44 is connected to the liquid feed pump. The overflow suction nozzle 54 is connected to the vacuum suction pump. The flow rate regulating portion regulates the flow rate of a liquid transported during the discharge or suction of liquid. When in an open position, the solenoid valve permits the liquid to be transported through the flow passage. When in a closed position, the solenoid vale disables the liquid transport. Incidentally, the tube, solenoid valve, flow rate regulating portion, pump, connecting component and the like can be constructed using the known arts.

The arrows schematically depict the flow of liquid during the liquid discharge. Discharge 401 illustrates the discharge of the system water downward in the Z direction from the opening mouth at the Z-direction lower end of the system water discharge nozzle 44. Suction 402 illustrates the suction of the overflow amount of system water upward in the Z direction form the opening mouth at the Z-direction lower end of the overflow suction nozzle 54.

In the step S8, the vertical movement of the system water discharge nozzle 44 is so controlled as to locate the Z-direction lower end thereof at the predetermined position Z1. According to the first embodiment, the lower end of the system water discharge nozzle 44 includes an opening mouth 410 cut at a predetermined cutting angle with respect to the horizontal plane. The position Z1 is defined to mean the lowest position of the slanted opening mouth 410 with respect to the Z direction. Aslant face of the opening mouth 410 is directed to the overflow suction nozzle 54. With this, a flow from the system water discharge nozzle 44 to the overflow suction nozzle 54 is formed, enhancing the efficiency of suction by the overflow suction nozzle 54. The opening mouth 410 at the lower end of the system water discharge nozzle 44 is not limited to the above-described configuration but may also be modified to define a horizontal plane.

The system water discharged from the opening mouth 410 at the lower end of the system water discharge nozzle 44 hits the bottom of the inside wall of the reaction vessel 2 so that the water flow is converted to a horizontal water flow, which is then converted to a vertical upward flow. Of the upward flow of the system water, an overflow amount of water rising beyond the position Z2 and flowing thereover is sucked from the lower end of the overflow suction nozzle 54.

In the step S8 to discharge the system water into the reaction vessel 2, the system water discharge mechanism 400 moves downward in the Z direction so as to insert apart of the system water discharge nozzle 44 along with the lower end thereof into the reaction vessel 2. A stop position of the lower end of the system water discharge nozzle 44 is defined to be a position Z1 with respect to the Z-direction position Z0 of the bottom of the inside wall of the reaction vessel 2. The position Z1 is defined to mean a Z-direction height of the lower end of the nozzle as specified according to the step S8. A gap between the lower end (position Z1) of the system water discharge nozzle 44 and the bottom (position Z0) of the inside wall of the reaction vessel 2 is defined to be a predetermined distance d1.

In conjunction with the system water discharge nozzle, a part of the overflow suction nozzle 54 along with the lower end thereof is inserted in the reaction vessel 2. A stop position of the lower end of the overflow suction nozzle 54 is defined to be a position Z2 with respect to the position Z0 of the bottom of the inside wall of the reaction vessel 2. The position Z2 is defined to mean a Z-direction height of the lower end of the nozzle as specified according to the step S8. The position Z2 defines a predetermined distance d4 from the bottom (position Z0). Further, the position Z2 also defines a predetermined distance d2 with respect to the position Z1 of the lower end of the system water discharge nozzle 44. Further, the position Z2 defines a predetermined distance d3 with respect to a position Zm of the top side of the inside wall of the reaction vessel 2.

With respect to the X direction and Y direction, the center axis of the system water discharge nozzle 44 may be located at any position in the opening plane of the reaction vessel 2. For example, the center axis of the above nozzle is located in vicinity of the center axis of the reaction vessel 2. With respect to the X direction and Y direction, the center axis of the overflow suction nozzle 54 may be located at place in vicinity of the center axis of the system water discharge nozzle 44. A diameter W1 of the system water discharge nozzle 44 and a diameter W2 of the overflow suction nozzle 54 are predetermined diameters smaller than that of the opening plane of the reaction vessel 2. According to the first embodiment, the nozzles not only in this step but also in the other steps have the same diameter (W1=W2) in common. The diameter includes, for example, an outside diameter 1.5 mm and an inside diameter 1.1 mm but is not limited to this. The diameter may vary depending upon each nozzle for each different role. While a horizontal cross-section of the reaction vessel 2 has a rectangular shape, for example, the reaction vessel may have a circular cross-section or the like. While a horizontal cross-section of each nozzle has a rectangular shape, for example, the nozzle may have a circular cross-section or the like.

In the step S8 to discharge the system water, the control unit 100 controls the system water discharge mechanism 400 as follows. The control unit 100 inserts the lower ends of the system water discharge nozzle 44 and overflow suction nozzle 54 into the reaction vessel 2 by moving down the system water discharge mechanism 400. The control unit brings the system water discharge mechanism to standstill while locating the lower ends of these nozzles at the predetermined positions shown in FIG. 4. Basically, the control unit 100 provides control such that the system water discharge nozzle 44 at standstill discharges the system water while the overflow suction nozzle 54 at standstill sucks the overflow amount of system water.

To discharge the system water in a predetermined timing, the control unit 100 starts the discharge of system water by opening the solenoid valve and driving the liquid feed pump to feed the system water to the system water discharge nozzle 44 via the tube and the like. Thus, the system water is discharged from the lower end of the system water discharge nozzle 44. To suck the overflow water in a predetermined timing, the control unit 100 opens the solenoid valve and drives the vacuum suction pump so as to start the water suction from the overflow suction nozzle 54. The liquid sucked through the overflow suction nozzle 54 is transported through the tube and the like and discharged.

After the discharge of the predetermined amount of system water into the reaction vessel 2, the control unit 100 stops the discharge and suction of the water and moves up the system water discharge mechanism 400 in the Z direction so as to extract the lower ends of the system water discharge nozzle 44 and overflow suction nozzle 54 from inside of the reaction vessel 2 and from the liquid surface.

FIG. 4 illustrates a position Zc as a position at a half of the Z-direction height H0 from the bottom (position Z0). The position Zb denotes a position at one third of the height H0 from the bottom. A position Za denotes a position at a quarter of the height H0 from the bottom. The position Z1 of the lower end of the system water discharge nozzle 44 is defined as a value in the range from the position Z0 to the position Zb.

Height Positional Relation of Nozzles in Individual Steps (1)

FIG. 5 shows a height-positional relation of the nozzles of the reaction vessel cleaning mechanism 17 and in the cleaning process S20. Just as in FIG. 3, the position Z0 of the bottom of the inside wall of the reaction vessel 2 and the position Zm of the top side thereof are shown in common on the XZ plane. The respective heights of the nozzles shown in FIG. 5 indicate the lower limit positions in the reaction vessel 2 when the reaction vessel cleaning mechanism 17 moves down to discharge or suck the liquid into or from the reaction vessel 2. The Z-direction upper ends of the nozzles are connected in common.

The position of the Z-direction lower end of each nozzle in each step, namely the distance between the inside bottom (position Z0) of the reaction vessel 2 and the lower end of each nozzle is defined to be the value in the predetermined range. The nozzles in the step satisfy a predetermined relative positional relation. The entire length of each nozzle in each step has any value that satisfies the condition of the distance or positional relation. In the case of the system water discharge nozzle 44 and the overflow suction nozzle 54 in the step S8 shown in FIG. 4, for example, the predetermined positions Z1, Z2 and the distances d1 to d4 are specified.

A height h1 is defined to mean a level of the maximum amount of reaction solution that is settable in the automatic analyzer. In a case where the width W0 of the inside wall of the reaction vessel 2 is 3.4 mm, an optical path is 5.6 mm and the height H0 of the inside wall of the reaction vessel 2 is 30 mm, for example, the maximum amount of reaction solution is 250 µL. In this case, the level h1 of the maximum amount of reaction solution is 13.1 mm.

(1) In the step S1 to suck the reaction solution, the suction of reaction solution is performed while moving down the reaction vessel cleaning mechanism 17 including the reaction solution suction nozzle 37 to the inside bottom (position Z0) of the reaction vessel 2. Further, the suction of the reaction solution is continued for a given length of time in a state where the lower end of the reaction solution suction nozzle 37 is in contact with the inside bottom of the reaction vessel 2. After the completion of the suction, the reaction solution suction nozzle 37 is moved up and the suction operation is completed. A specific shape of the reaction solution suction nozzle 37 is as follows. The opening mouth at the tip of the nozzle is cut at a predetermined cutting angle (cutting angle=15 degrees).

(2) The step S2 discharges a system water 502 to a level h2 equivalent to a liquid surface higher than the level h1 (h2>h1). For example, the liquid levels are defined as h2≈h1+7 mm≈20 mm. In the step S2, in conjunction with the downward movement of the system water discharge nozzle 38, the lower end of the overflow suction nozzle 51 is located at a distance of the level h2 from the inside bottom of the reaction vessel 2, namely at the height of 20 mm. The system water discharge nozzle 38 is configured to have a longer tip than the overflow suction nozzle 51. For example, the lower end portion of the system water discharge nozzle 38 is 2 mm longer than the lower end portion (position z2) of the overflow suction nozzle 51. Namely, the lower end of the system water discharge nozzle 38 is located at a level of h2-2 mm.

The discharge amount of system water in the step S2 is controlled to a predetermined value. This discharge amount is at least a volume to raise the water level to the lower end (position z2) of the overflow suction nozzle 51 and is 381 mL or more, for example. The reason that the overflow suction nozzle 51 is located at the position z2 at the level h2 is to prevent the adhesion of the reaction solution component to an upper part (range higher than the level h1) of the inside wall of the reaction vessel 2 because the water in the step S2 contains a large amount of reaction solution component. Therefore, the level h2 is defined to be a value more than the level h1 and equal to or less than 2×h1 (h1<h2≤2×h1). Further, the reason that the system water discharge nozzle 38 is longer than the overflow suction nozzle 51 is to prevent the system water being discharged from scattering as drawn toward the overflow suction nozzle 51. Further, the reason that the lower end of the system water discharge nozzle 51 is located in vicinity (position of h2-2 mm) to the liquid surface (level h2) of the system water is to minimize an area where the system discharge nozzle 51 is contaminated with the reaction solution component.

(3) The step S3 to suck the system water is performed using the system water suction nozzle 39 and the same way as the step S1.

(4) In the step S4 to discharge the detergent A, the detergent-A discharge nozzle 40 and the overflow suction nozzle 52 are so located as to secure a level h3 as a liquid surface level equal to or higher than the level h2. The detergent-A discharge nozzle 40 and the overflow suction nozzle 52 are positioned in the same positional relation as that in the step S2. In a case where the same amount of liquid (level h2) is used in the step S2 and the step S4, for example, the overflow suction nozzle 52 is located at the position z2 20 mm above the inside bottom of the reaction vessel 2 while the detergent-A discharge nozzle 40 is located at a position of a level h3-2 mm. In a case where the level h3 as the liquid surface level of the discharged detergent A in the step S4 is higher than the liquid level in the step S2, the relative positional relation between the detergent-A discharge nozzle 40 and the overflow suction nozzle 52 is not changed but the heights of these nozzles from the inside bottom of the reaction vessel 2 are changed as shown in the figure. However, the level h3 is not set at an excessively high position because of the fear that the detergent components may be carried over to the subsequent step. The level h3, for example, has an upper limit of h2+3 mm (h2<h3≤h2+3 mm). According to the example shown in the figure, a position z3 at the level of the detergent A is expressed as h3=h2+3 mm≈23 mm.

The discharge amount of the detergent A is controlled to a predetermined value. The discharge amount is as much as to raise the liquid level up to the lower end of the overflow suction nozzle 52. In a case where the lower end of the nozzle is at 20 mm high from the inside bottom of the reaction vessel, for example, the discharge amount is 381 mL or more.

(5) The step S5 to suck the detergent A is performed using the cleaning liquid suction nozzle 41 and the same way as the suction of the reaction solution in the step S1.

(6) The step S6 to discharge the detergent B is performed using the detergent-B discharge nozzle 42 and the same way as the discharge of the detergent A in the step S4. The height positions of the lower ends of the detergent-B discharge nozzle 53 and the overflow suction nozzle 53 are the same as the height positions in the step S4.

(7) The step S7 to suck the detergent B is performed using the cleaning liquid suction nozzle 43 for and the same way as the suction of the reaction solution in the step S1.

(8) The step S8 discharges a system water 508 by using the system water discharge mechanism 400 shown in FIG. 4. The control unit 100 moves down the system water discharge mechanism 400 in the Z direction so as to insert the lower ends of the system water discharge nozzle 44 and the overflow suction nozzle 54 in the reaction vessel 2 and to locate the same at predetermined positions. In this state, the control unit 100 provides control such that the system water discharge nozzle 44 discharges the system water 508 while the overflow suction nozzle 54 sucks the overflow amount of system water. After the discharge of the predetermined amount of water, the control unit 100 moves upward the system water discharge mechanism 400 in the Z direction so as to extract the nozzles from inside of the reaction vessel 2.

In the step S8 to discharge the system water 508, the system water is discharged into the reaction vessel 2 where there remains a relatively large amount of the surfactant component of the detergent A in the above-described step S4 or of the detergent B in the step S6 or the surfactant components of the both detergents. In the step S8, therefore, the air bubble production is prone to occur in the reaction vessel 2. On the other hand, the discharge of the system water 508 in the step S8 serves dual purposes of cleaning an upper part of the inside of the reaction vessel 2 where the detergent is not delivered, and of rinsing off the above-described detergent component. In the step S8, therefore, it is required to widen the cleaning range in the Z direction and to dispense the largest possible amount of cleaning liquid into the reaction vessel 2.

Concentration of Component Used in Cleaning Process

Figure 6:
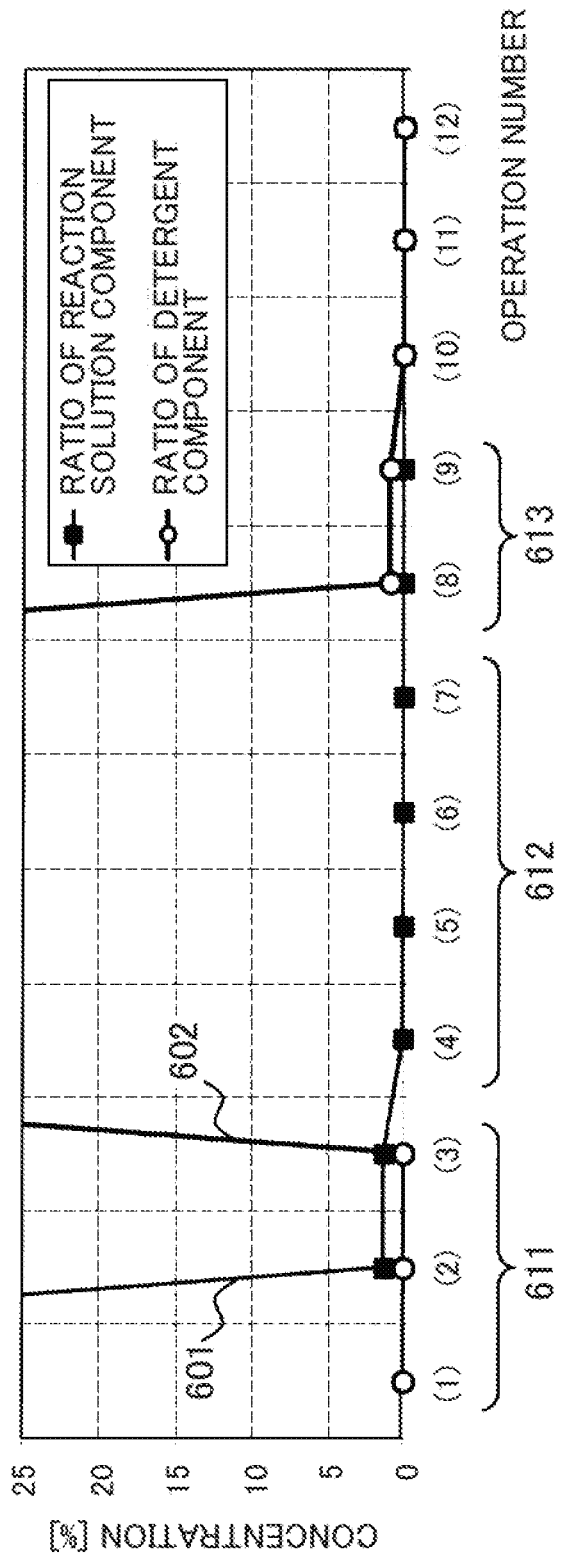
FIG. 6 is a diagram of the automatic analyzer according to the first embodiment hereof, showing an example of concentration transition of reaction solution component and detergent component used in the cleaning process.

FIG. 6 shows an example of concentration transition (ratio) of the reaction solution component and the detergent component used in the cleaning process S20. In FIG. 6, the abscissa is the operation number corresponding to the step while the ordinate is the concentration [%]. A transition 601 denotes the transition of concentration of the reaction solution component while a transition 602 denotes the concentration of the detergent component. FIG. 6 shows the results of calculation performed on the assumption that 5 µL of residual water exists in the reaction vessel 2 after the suction. A region 611 (the steps S1 to S3) denotes a region where contamination with the reaction solution component should be avoided. A region 612 (the steps S4 to S7) denotes a region where contamination with the detergent component should be avoided. A region 613 (the steps S8 to S9) denotes a region where a relatively large amount of detergent component remains.

As described above, the air bubble production is prone to occur in the reaction vessel 2 when the system water is discharged in the step S8. If an automatic analyzer of a comparative example applies the discharge method such as used in the steps S2, S4, S6 to the step S8, a large amount of air bubble will be produced. Hence, the air bubble is more likely to remain in the reaction vessel 2 till the blank value measurement in the subsequent step S13. If the air bubble exists in a photometric region (region where an optical measurement light passes) in the step S13, the measurement results of blank value may be deteriorated or indicate abnormal values.

In the discharge method used in the steps S2, S4, S6 and the step S10 to be described hereinlater, the level reached by the liquid such as the system water and detergent can be definitely set by means of the overflow suction nozzles 51, 52, 53, 55. Strictly speaking, however, the water level instantaneously varies due to the undulation or ripple of the liquid surface during or immediately after the discharge of each liquid. As shown in FIG. 7 to be described hereinlater, if the discharge method such as of the step S2 is used when it is desirable to secure the widest possible cleaning range such as of the system water discharge in the step S8, the liquid level varies during or immediately after the discharge of the liquid. Therefore, it is possible that the level of the liquid (liquid surface height as determined at horizontal position) instantaneously exceeds the height position of the overflow suction nozzle 54 so that the liquid (detergent) overflows the top side (position Zm) of the reaction vessel 2.

System Water Discharge Step of Comparative Example

FIG. 7 illustrates a problem encountered by the automatic analyzer of the comparative example when the conventional discharge method such as applied to the steps S2, S4, S6 is used for the system water discharge (equivalent to the step S8). A fragment A of FIG. 7 shows a state where the system water is being discharged with the nozzles located at the predetermined positions. A lower end of an overflow suction nozzle 702 is located in the reaction vessel 2 at a position Zy in vicinity to the top side (position Zm) of the Z-direction upper part thereof. A lower end of a system water discharge nozzle 701 is located at a position Zx slightly below the position Zy. An ideal fixed cleaning range 710 corresponds to the height position Zy of the overflow suction nozzle 702. In the state shown in the fragment A, the air bubble is produced in the system water. In the state of the fragment A, the air bubble is produced in the system water.

A fragment B of FIG. 7 shows a state where the discharge of system water started in the substep of the fragment A has raised the system water level to the position Zy of the lower end of the overflow suction nozzle 702. The surface of the system water undulates or ripples relative to the position Zy in the Z direction and the fragment shows a liquid-surface undulation range 720 in the Z direction. That is, an overflow of system water 730 from an end of an opening mouth in the top side (position Zm) of the reaction vessel 2 has occurred.

In the states of the fragments A, B, the air bubble is prone to be produced by mixture of the residual detergent component (surfactant component) carried over from the preceding steps with the system water. The air bubble is particularly likely to occur because the liquid discharged from the position Zx far above the bottom of the reaction vessel 2 hits a liquid layer near the bottom.

In contrast to the fragment B, a fragment C of FIG. 7 shows an example where the height reached by the liquid surface varies, namely a liquid-surface undulation range 740. On the inside-wall side surface of the reaction vessel 2, the height and range reached by the liquid surface vary depending upon specific positions, resulting in uneven cleaning. The fragment shows an uneven cleaning range 750. On a left side surface of the inside wall as seen in the figure, for example, an extent of the liquid delivery defines a left-side cleaning range 761. On a right side surface of the inside wall as seen in the figure, an extent of the liquid delivery defines a right-side cleaning range 762. These cleaning ranges differ in height and area. Namely, the actual cleaning range is uneven and varied relative to the ideal cleaning range.

A fragment D of FIG. 7 shows how the subsequent step to measure the blank value is performed. A blank-value measurement system water 770 is discharged into the reaction vessel 2, in which the air bubble from the preceding steps remains. This leads to fear that the air bubble affects the measurement of blank value, deteriorating the measurement accuracy.

In a method where the level reached by the liquid surface is lowered by decreasing the discharge amount of cleaning liquid so as to prevent the overflow of the cleaning liquid as illustrated by the fragment B of FIG. 7, the aforementioned undulation and ripple of the liquid surface cause the cleaning liquid to unevenly hit the inside-wall side surface of the reaction vessel 2. Namely, the cleaning range and cleaning effects vary. This causes the liquid components in the reaction vessel 2 to be carried over to the subsequent steps or causes the accumulation of contaminants on the inside-wall side surface.

Specifically, it is desirable that the discharge of system water in the step S8 is performed in a manner to widen the cleaning range almost to the upper limit in the Z direction of the reaction vessel 2 and to suppress the air bubble production while minimizing the variation of the cleaning range.

System Water Discharge Step (Step S8)

Figure 8:
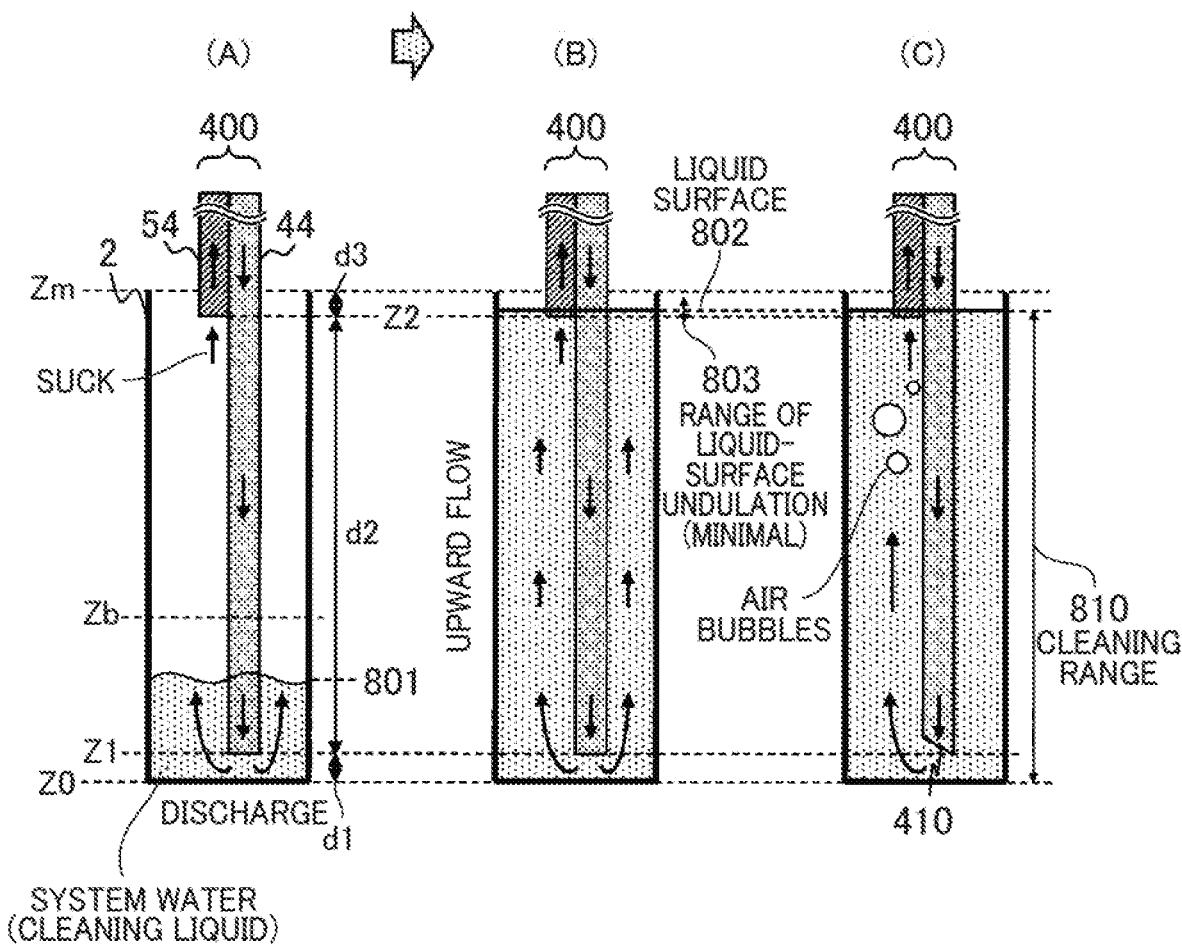
FIG. 8 is a diagram of the automatic analyzer according to the first embodiment hereof, illustrating the matters concerning the discharge of system water in the step S8.

To achieve the above-described object, the automatic analyzer of the first embodiment provides the characteristic control in the step S8 as shown in FIG. 8 by using the system water discharge mechanism 400 as shown in FIG. 4.

FIG. 8 shows how the the step S8 is controlled according to the first embodiment. A fragment A of FIG. 8 shows a state where the lower ends of the system water discharge nozzle 44 and the overflow suction nozzle 54 of the system water discharge mechanism 400 are inserted in and stopped at places in the reaction vessel 2. In the predetermined layout of the nozzles as shown in FIG. 4, the lower end of the system water discharge nozzle 44 is located at the position Z1 and the lower end of the overflow suction nozzle 54 is located at the position Z2. The figure shows a state where the system water as the cleaning liquid is discharged from the opening mouth at the lower end of the system water discharge nozzle 44. The height of liquid surface (liquid level) is at a position 801, for example. In this state, the suction operation of the overflow suction nozzle 54 is started. The system water discharged from the lower end of the system water discharge nozzle 44 hits the bottom to form a horizontal flow, which is further converted to the vertical upward flow.

The system water discharge nozzle 44 is configured to be longer than the overflow suction nozzle 54 such that the system water discharge nozzle can be located at the position Z1 near the inside bottom (position Z0) of the reaction vessel 2 at the completion of the downward movement. For example, the position Z1 is defined to be at one third or less (position Zb in FIG. 4) of the overall height H0 of the inside wall of the reaction vessel 2 (Z0<Z1≤Zb). A sufficient effect can be obtained if the position Z1 is in this range. The first embodiment particularly defines the position Z1 to be so close to the bottom as equal to or less than the position Za at a quarter of the height H0.

A fragment B of FIG. 8 shows a state where the water discharge continues from the substep A so that the level of the system water goes up to and a little beyond the position Z2 of the lower end of the overflow suction nozzle 54. The height of liquid surface is represented by a liquid level 802. An upward liquid flow from the bottom in the Z direction is formed in the reaction vessel 2. The control unit 100 controls the discharge amount of system water to a predetermined value. The discharge amount of system water is as much as to raise the liquid level up to the position Z2 of the lower end of the overflow suction nozzle 54.

The control unit 100 controls the discharge rate and velocity of the system water so as to limit the range of undulation and ripple of the liquid surface to a certain degree. An undulation range of the liquid surface 802 is a very small range in the Z direction and indicated at 803. This is effective to prevent the overflow of the liquid from the top side (position Zm).

As a modification of the embodiment, the control unit 100 may at first control the discharge rate and velocity of the liquid in a relatively fast first mode in a state where the liquid surface is located in a lower part (e.g., up to the half position Zc as shown in FIG. 5) of the reaction vessel 2. Subsequently, the control unit 100 may control the discharge rate and velocity of the liquid in a relatively slow second mode in a state where the liquid surface is located in the upper part (e.g., above the position Zc) or in vicinity to the position Z2. This modification is adapted to reduce the time taken by the step S8 as well as to suppress the undulation of liquid surface.

A fragment C of FIG. 8 goes into detail of the fragment B, showing a case where the system water discharge nozzle 44 has the same structure as that of FIG. 4 or is formed with the opening mouth 410 by cutting the lower end at the cutting angle. A main flow of the liquid from the opening mouth 410 is directed toward the lower end of the overflow suction nozzle 54. The fragment shows a cleaning range 810 of the first embodiment. This cleaning range 810 covers a large area almost reaching the top side of the reaction vessel 2, defining a more uniform area than that of the conventional example (FIG. 7). Further, the uneven cleaning of the inside-wall side surface of the reaction vessel 2 is negligible.

As shown in the fragments B and C of the figure, the mechanism and control of the first embodiment suppress the air bubble production in the step S8. Even when the air bubble occurs in the step S8, the air bubble is separated or removed. Specifically, the air bubble is carried by the upward flow in the reaction vessel 2 so as to be sucked by the overflow suction nozzle 54 or to flow out from the liquid surface 802. Therefore, the air bubble is less prone to remain in the reaction vessel 2.

According to basic control, timing for starting the discharge of system water in the step S8 is after the lower end of the lowered system water discharge nozzle 44 reaches the position Z1. In this state, the system water discharged from the system water discharge nozzle 44 rises vertically upward from the inside bottom of the reaction vessel 2. Therefore, the air bubble production is less prone to occur. If the air bubble should occur, the upward liquid flow is so formed as to separate the air bubble from the inside of the reaction vessel 2 and to move the air bubble toward the liquid surface 802.

The control of the start timing for the discharge of system water in the step S8 is not limited to the above but may be in any other mode that satisfies predetermined conditions. For example, the discharge of system water may be controlled to be started during the downward movement of the nozzle. Specifically, the control is provided as follows.

Figure 9:
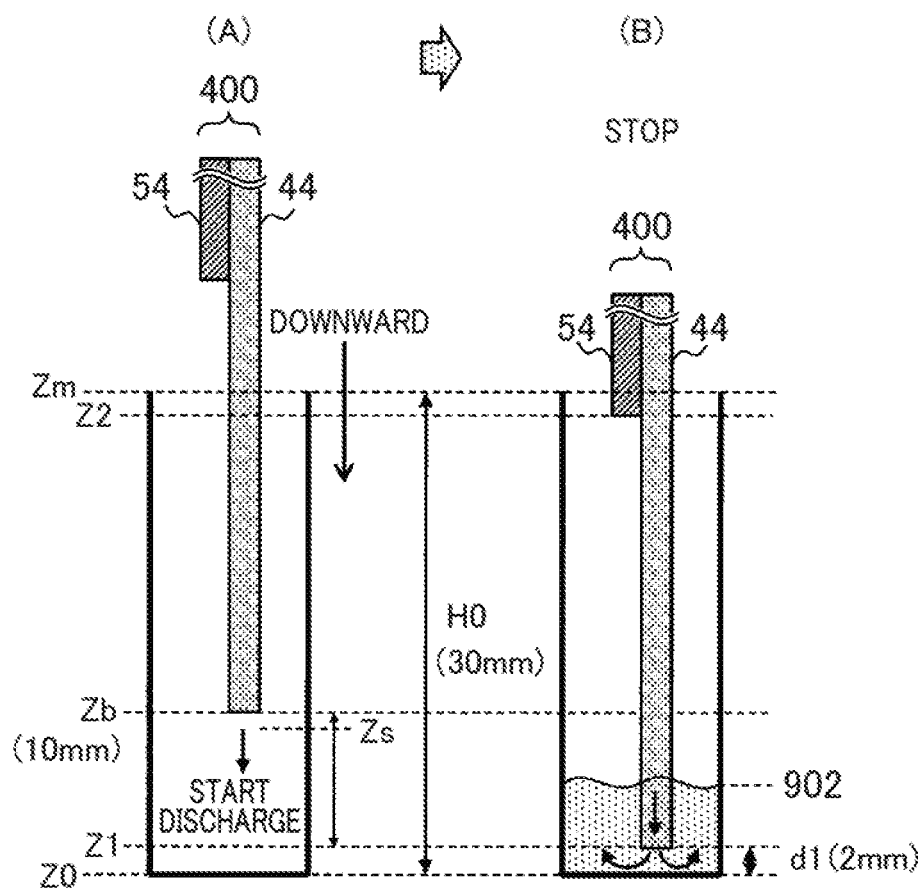
FIG. 9 is a diagram of an automatic analyzer according to a modification of the first embodiment hereof, illustrating a control example of downward movement.

FIG. 9 shows an example of control, as modification, to start the discharge of system water during the downward movement of the system water discharge nozzle 44. A fragment A of FIG. 9 shows a state where the system water discharge mechanism 400 is moving down or a state before the lower end of the system water discharge nozzle 44 reaches the position Z1. Assumed that the height H0 of the inside wall of the reaction vessel 2 is 30 mm. Then, the position Zb at one third of the height of the inside wall is 10 mm. A position corresponding to the start timing for the discharge of system water is defined as position Zs. The position Zs is defined to be higher than the position Z1 and at or below the position Zb (Z1<Zs≤Zb). For example, the start position is defined to be equal to the position Zb. The control unit 100 starts the discharge of system water at a time when the lower end of the system water discharge nozzle 44 reaches the position Zb.

A fragment B of FIG. 9 shows a state where the downward movement of the fragment A is completed so that the discharge nozzle is located at the same predetermined position as shown in FIG. 4. The lower end of the system water discharge nozzle 44 is at the position Z1 or at the distance d1 from the inside bottom is 2 mm, for example. In this state, a certain amount of system water has already been discharged to a liquid surface level 902. This modification pushes forward the start timing for the discharge of system water and hence, the time taken by the step S8 is further reduced while the processing efficiency is further improved.

The Z-direction length of the system water discharge nozzle 44 depends upon a positional relation between the reaction vessel 2 and the overflow suction nozzle 54. In FIG. 4, for example, the distance d2 from the lower end of the system water discharge nozzle 44 to the lower end of the overflow suction nozzle 54 is defined to be two thirds or more of the height H0 of the reaction vessel 2 ($d2 \geq H0 \times 2/3$).

The configuration of the tip of the system water discharge nozzle 44 may have the cutting angle or not. In a case where the nozzle is configured to have no cutting angle, as shown in the fragment B of FIG. 8, the distance d1 of at least 1 mm is provided as the gap. In a case where the nozzle is configured to have the cutting angle (e.g., 15 degrees) as shown in FIG. 4 and by the fragment C of FIG. 8, the distance d1 as the gap is provided likewise. However, the opening mouth 410 is formed. Therefore, the mechanism may be configured to bring the nozzle tip into contact with the inside bottom of the reaction vessel.

Particularly, in a case where the opening mouth 410 at the lower end of the system water discharge nozzle 44 includes the slant face tilted at the cutting angle, the slant face at the cutting angle is directed to the position of the overflow suction nozzle 54 as shown in FIG. 4 and the like. The cutting angle is defined to be 10 degrees or more, such as 15 degrees, with respect to the horizontal plane. This provides for the formation of the liquid flow from the lower end of the system water discharge nozzle 44 to the lower end of the overflow suction nozzle 54. Even when the air bubble is produced, this configuration is adapted to efficiently drive the air bubble to the overflow suction nozzle 54 along the liquid flow.

Height Positional Relation of Nozzles in Individual Steps (2)

Now returning to FIG. 5, the description is continued. At the end of the downward movement, the lower end of the overflow suction nozzle 54 is located at the position Z2 in vicinity to the top side (position Zm) of the reaction vessel 2. The position Z2 as the position near the top side of the reaction vessel 2 is defined to be in the range from the top side (position Zm) to at 95% of the height H0. The overflow suction nozzle 54 in the step S8 is located at the highest position Z2 of the positions where the overflow suction nozzles 51 to 55 are located in the cleaning process S20. The lower ends of the overflow suction nozzles in the other steps are located at the positions z2, z3, z4 and the like which are lower than the position Z2. The height (maximum value) of the liquid surface of the system water in the step S8 is represented by h4. The height h4 is in vicinity to a liquid level near the position Z2 of the lower end of the overflow suction nozzle.

Because of the discharge method of the first embodiment, the undulation and ripples of the liquid surface can be suppressed during the discharge of the system water (FIG. 8). Therefore, the level of the system water (cleaning liquid) can be raised almost to the edge of the top side of the reaction vessel 2. This permits the position Z2 of the overflow suction nozzle 54 to be located at the highest position as described above so that the cleaning range can be expanded in the Z direction. The position Z2 of the overflow suction nozzle 54 is designed in conformity to the height h4 reached by the liquid surface 802 of the system water. The position Z2 is at a distance of 29 mm, for example, as the distance d4 (FIG. 4) from the inside bottom (position Z0) of the reaction vessel 2 or at a distance of 1 mm as the distance d3 from the top side thereof. The height h4 is also at the comparable level.

The discharge amount of system water (cleaning liquid) in the step S8 is as much as to raise the water level to the position Z2 of the overflow suction nozzle 54 or to suppress to a certain degree the liquid surface undulation and the like caused by an excessive flow rate of the discharged liquid. For example, the discharge amount of the system water is defined to be in the range of 97 to 110% of the cubic capacity of the reaction vessel 2. The control unit 100 regulates and controls the discharge amount by means of the flow rate regulating portion.

The position Z2 (distance d4) of the overflow suction nozzle 54 and the position Z1 (distance d1) of the coupled system water discharge nozzle 44 may be changed under the control of the control unit 100 within a predetermined range in accordance with a water level (height h4) to be reached. The system water discharge nozzle 44 and the overflow suction nozzle 54 of the cleaning mechanism are not limited to the coupled structure but can be modified. These nozzles can be configured such that the vertical movements thereof and the lower positions thereof are independently controlled.

In the step S8 of the first embodiment which is unlike the discharge method of the steps S2, S4, S6 (the comparative example of FIG. 7), the system water discharged from the nozzle does not hit against the inside bottom of the reaction vessel 2 or the liquid layer therein and hence, the undulation and ripple of the liquid surface are suppressed (FIG. 8). It is therefore possible to secure the liquid level 802 and cleaning range 810 of substantially theoretical values in correspondence to the position Z2 of the overflow suction nozzle 54. In the first embodiment, water level variation from one reaction vessel 2 to another (liquid-surface undulation range 803) in the step S8 can be limited to 1 mm or less.

In the step S8, the mechanism is so controlled as not to move upward till the completion of discharge of a predetermined amount of system water. The control unit 100 starts the upward movement of the system water discharge mechanism 400 including the system water discharge nozzle 44 and the overflow suction nozzle 54 after the completion of discharge of the system water. In the step S8, the upward movement of the mechanism for extracting the individual nozzles is controlled after the overflow suction nozzle 54 has suck out all the air bubble produced and after the surface of system water (cleaning liquid) is stabilized. In the step S8, the Z-direction range in which the nozzle is immersed in the liquid is larger than those in the other steps. When the immersed nozzle is extracted in the step S8, therefore, care must be taken to prevent dropping or scattering of the liquid adherent to the system water discharge nozzle 44. In other words, it is necessary to avoid the overflow from the top side of the reaction vessel 2 and the adhesion of the liquid to the side surface of the inside wall which are caused by the dropping of the liquid or the like. Therefore, the automatic analyzer of the first embodiment provides proper control of the timing of the upward movement and the like in the step S8. Specifically, the upward movement is controlled as the following control example.

Figure 10:
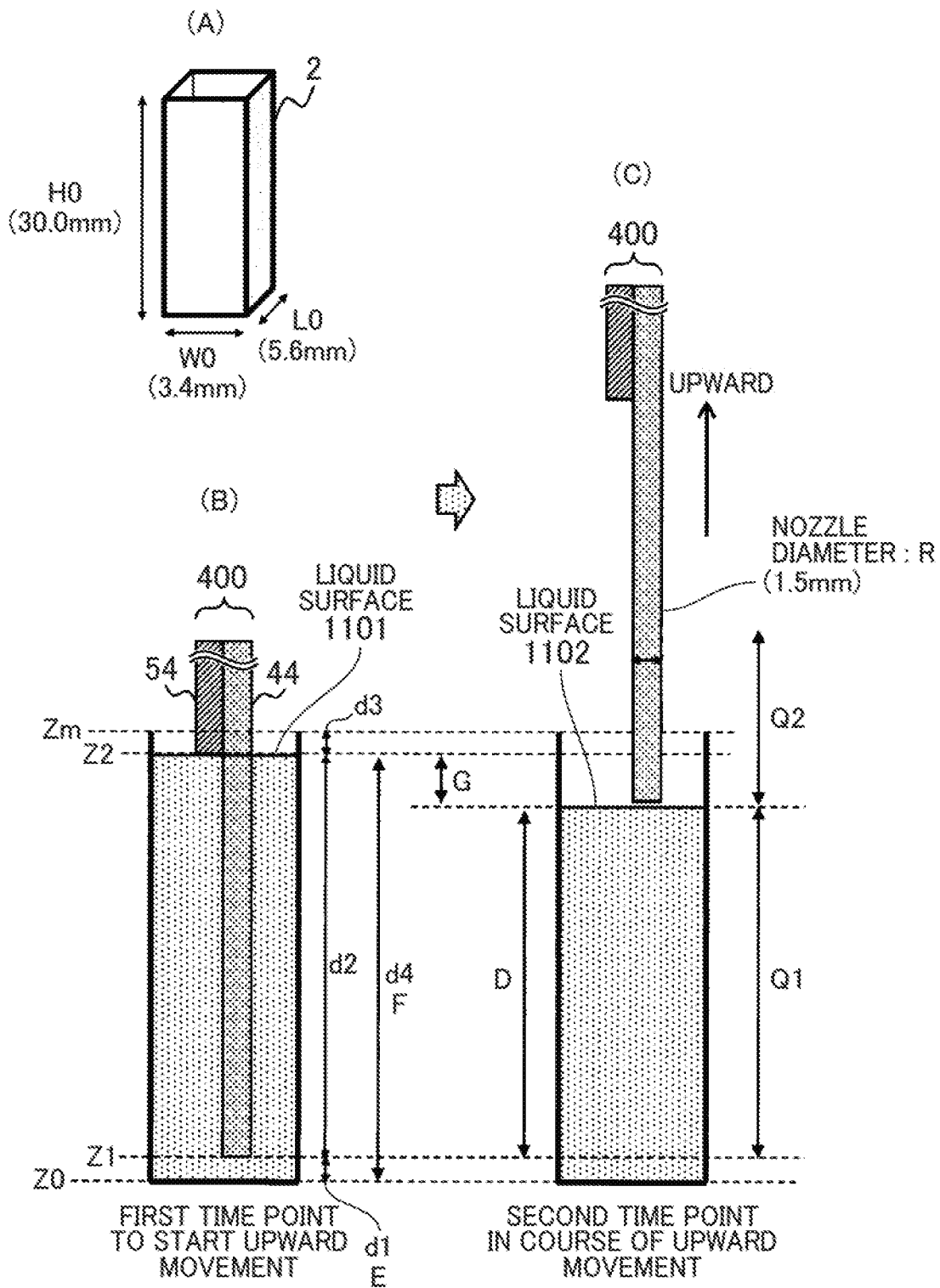
FIG. 10 is a first diagram of the automatic analyzer according to the modification of the first embodiment hereof, illustrating a control example of upward movement.

FIG. 10 shows a control example of the upward movement according to the first embodiment. A fragment A of FIG. 10 shows a configuration and cubic capacity of the reaction vessel 2. For example, it is assumed that the width W0 of the inside wall of the reaction vessel 2 is 3.4 mm, the length of optical path L0 is 5.6 mm and the height H0 is 30 mm. Roughly, the cubic capacity of the reaction vessel 2 is 3.4×5.6×30 mm. Further, it is assumed, for example, that the diameter R of the system water discharge nozzle 44 and the like (the above-described W1, W2) is 1.5 mm.

A fragment B of FIG. 10 shows the predetermined positions Z1, Z2 of the individual nozzles of the above-described system water discharge mechanism 400. The figure shows a state where the system water discharge nozzle 44 is immersed in the system water or a state at a first time point to start the upward movement. It is noted here that the height of the liquid level 802 is equal to the position Z2.

A fragment C of FIG. 10 shows a second time point in the course of the upward movement, or the time point when the lower end of the system water discharge nozzle 44 has just left a liquid surface 1101. A distance D denotes a distance from the position Z1 to the liquid surface 1101.

A fact that when the system water discharge nozzle 44 is extracted by the upward movement, the level of the system water lowers by a value equivalent to a volume of a part of the system water discharge nozzle 44 that was immersed in the system water is taken into account. In this example, the liquid surface 1101 is lowered to a liquid surface 1102. Based on this fact, the distance D moved up by the system water discharge nozzle before leaving the liquid surface 1102 is calculated.

The automatic analyzer provides control such that the mechanism moves up at low speed till the nozzle leaves the liquid surface but moves up at high speed after the nozzle leaves the liquid surface. In a Z-direction range Q1 corresponding to a first period between the first time point to start the upward movement and the second time point to leave the liquid surface, the control unit 100 controls the speed of the upward movement of the system water discharge mechanism 400 to be a relatively low first rise speed. In a Z-direction range Q2 corresponding to a second period after the second time point, the control unit 100 controls the speed of the upward movement of the system water discharge mechanism 400 to be a relatively high second rise speed. The first rise speed is defined to be lower than a speed of a normal downward movement of the nozzle, for example. The second rise speed is defined to be higher than the speed of the normal downward movement of the nozzle, such as the highest possible speed for the mechanism. It is noted that the upward movement may be accelerated. Specifically, the acceleration is defined as illustrated by a diagram of FIG. 11.

The distance D corresponding to the range Q1 is calculated as follows. A distance E denotes the above-described distance d1 of the gap at the bottom. A distance F denotes the above-described distance d4 from the bottom to the overflow suction nozzle 54 (liquid surface 1101). The distances E, F are design values. A distance G denotes a difference between the liquid surface 1101 and the liquid surface 1102 before and after the speed change. Using the distances D, F, G, the distance D is expressed by an equation (1) D=F−G−E. Assumed that V[µL] denotes a volume of a part of the system water discharge nozzle 44 that is immersed in the system water. The volume of a part of the system water discharge nozzle is expressed by an equation (2) $V=R^2 \times \pi \times (F-E)$. The distance G equivalent to the amount of height change of the system water discharge nozzle 44 after extraction is expressed by an equation (3) $G=V/(L0 \times W0)$. The distance D can be obtained from the above equations (1) to (3).

Figure 11:
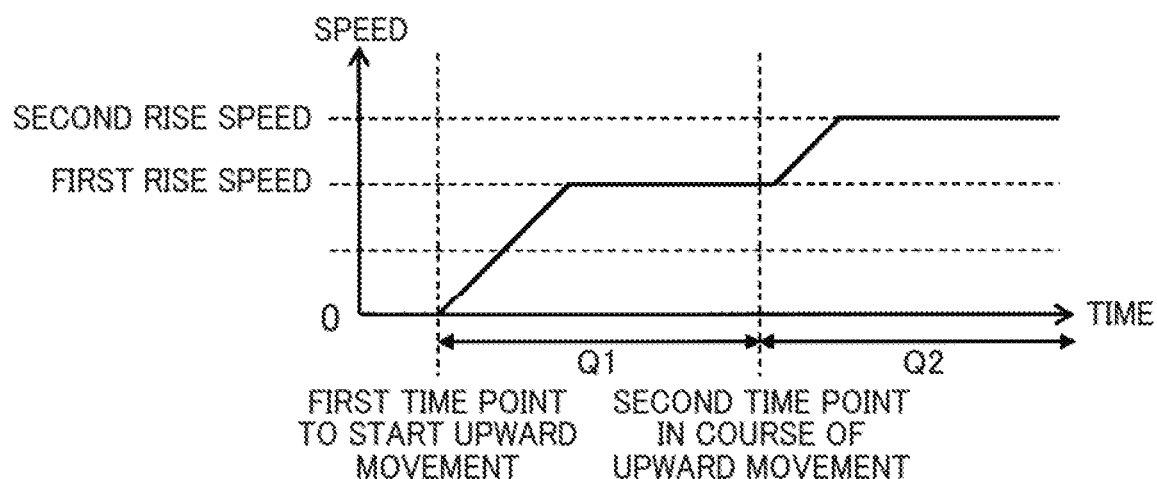
FIG. 11 is a second diagram of the automatic analyzer according to the modification of the first embodiment hereof, illustrating a control example of upward movement.

Referring to FIG. 11, the first rise speed for the range Q1 is defined to be, for example, equal to or less than two thirds of the second rise speed. The first rise speed for the range Q1 may be controlled to be a constant speed or to be accelerated to the second rise speed for the range Q2. In the range Q2 where the lower end of the system water discharge nozzle 44 is moved over the distance D, the nozzle is moved up at the maximum speed as the second rise speed. The absolute amount or varied amounts of the liquid adhered to the system water discharge nozzle 44 can be reduced by the above-described control of upward movement. This is effective to prevent the above-described undulation of liquid surface caused by the dropping or scattering of the liquid and to shorten the time required for the upward movement.

Control of Overflow Suction Nozzle

Figure 12:
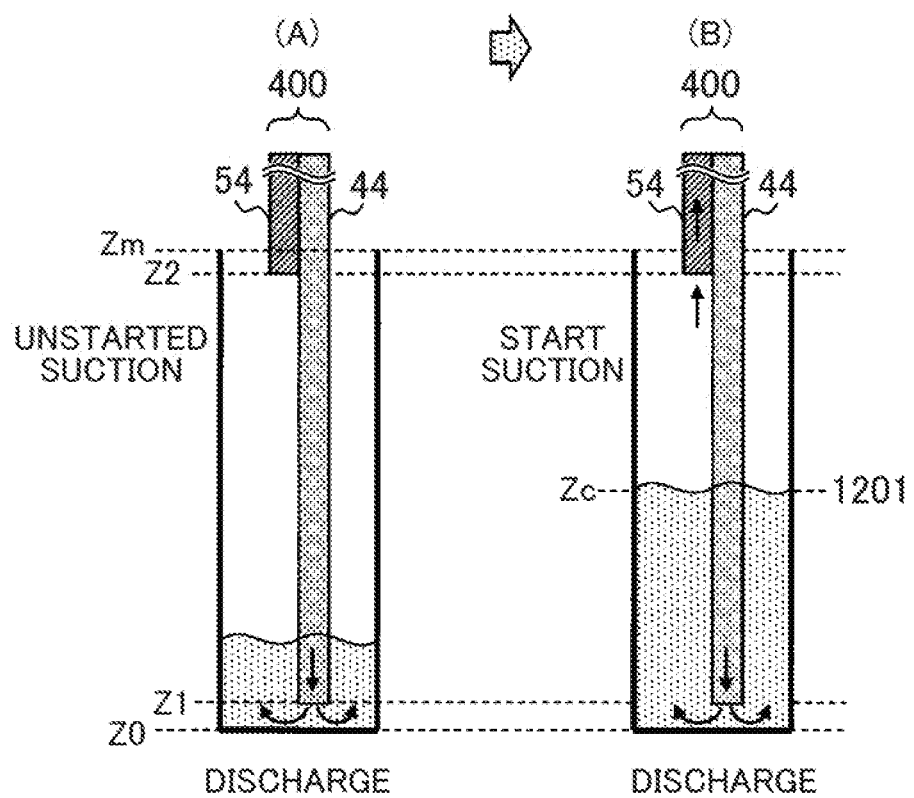
FIG. 12 is a diagram of the automatic analyzer according to the modification of the first embodiment hereof, showing a control example of an overflow suction nozzle.

As a modification of the first embodiment, the suction timing for the overflow suction nozzle 54 in the step S8 may be controlled as follows. Under the basic control, the time to start the overflow suction is when the downward movement is started as described above, but not limited to this. The overflow suction may also be started when the nozzle comes to a stop at completion of the downward movement. FIG. 12 shows a control example of the overflow suction timing according to the modification. A fragment A of FIG. 12 shows a state where the nozzles are located at the above-described predetermined positions by the downward movement of the system water discharge mechanism 400 in the step S8. During the downward movement, the control unit 100 does not yet start the suction operation by the overflow suction nozzle 54. The control unit 100 starts the discharge of system water in the stationary state of the fragment A (or during the above-described downward movement). The control unit 100 starts the suction operation by the overflow suction nozzle 54 after a lapse of a predetermined length of time from the point of starting the discharge or after the discharge of a predetermined portion of the above-described predetermined discharge amount. A fragment B of FIG. 12 shows a state at the point of starting the suction operation by the overflow suction nozzle. According to the embodiment, the state where a liquid level 1201 is at the position Zc or at a half the height H0 is shown. At this point of time, the suction by the overflow suction nozzle 54 is started.

Height Positional Relation of Nozzles in Each Step

Returning to FIG. 5, description is made on the steps from the step S9 onward.

(9) The step S9 to suck the system water is performed using the system water suction nozzle 45 and the same way as the step S1.

(10) The step S10 discharges the system water by using the system water discharge mechanism including the system water discharge nozzle 46 and the overflow suction nozzle 55 and by following either of the above-described method of the step S8 or of the step S2, S4, S6 according to the structure of the automatic analyzer. The first embodiment illustrates the case where the same method as that of the step S2, S4, S6 is used. That is, the height positions of the nozzles in the step S10 differ from those in the step S8.

When the step S10 is performed, very little detergent component remains in the reaction vessel 2 because of the operations performed in the step S8 and the step S9, as shown in FIG. 6. It is therefore expected that very little air bubble is produced in the step S10. If the air bubble should be produced, the air bubble is expected to be less than that produced in the step S8. When the step S10 is performed, almost all of the detergent component is substituted by the system water. Therefore, a main role of the step S10 is to rinse off the detergent component carefully while a role of the step S8 is to wash and rinse. Accordingly, the step S10 does not require such a strict control of the extent of liquid delivery (cleaning range) as that of the step S8. Hence, the same method as that of the step S2, S4, S6 is applicable to the step S10. The position of the lower end of the overflow suction nozzle 55 in the step S10 is represented by a height h5 from the bottom. The position of the lower end of the system water discharge nozzle 46 is defined to be slightly below the lower end of the overflow suction nozzle 55 and is represented by a height h6 from the bottom.

In the state of the step S10, on the other hand, very little surfactant component remains in the reaction vessel 2 so that the surface tension of the system water (cleaning liquid) is increased. In the step S10, therefore, droplets of the cleaning liquid are prone form around the tip of the system water discharge nozzle 46 when the system water discharge nozzle 46 is extracted after the completion of water discharge. The droplets are likely to fall on the liquid surface from the tip of the system water discharge nozzle 46.

The reaction vessel cleaning mechanism 17 has a structure where some operating part or element is shared by the plural nozzles for each of the plural steps, as described above. As a result, the analyzer achieves merits such as downsizing and price reduction of the apparatus. However, this structure suffers from a disadvantage of making it difficult to make specific settings for different operations of respective nozzles. For example, it is assumed that the upward movement of the system water discharge nozzle 44 in the step S8 is defined as described above. In the reaction vessel cleaning mechanism 17, the system water discharge nozzle 46 for the step S10 and the system water discharge nozzle 44 for the step S8 have a part of their upper ends connected in common to the mechanism. The lower ends of these nozzles are designed to have a predetermined height relation. Namely, these nozzles perform substantially the same upward and downward movements. Unless a mechanism dedicated to the specific purpose is added, these nozzles cannot perform independent movements where while one of the nozzles moves upward, the other moves downward.

The nozzle for the step S10 and the nozzle for the step S8 are operatively connected to perform the upward movement. It is necessary to take measure to prevent the occurrence of the aforementioned problem when the lower ends of the nozzles are removed from the liquid surface. In order to satisfy this condition, the same method as that of the step S8 or that of the step S2 is applied to the step S10. In the step S10, the height positions of the system water discharge nozzle 46 and the overflow suction nozzle 55 may be so defined as to be higher than the height positions thereof in the step S2 and the like. The position (height h6) of the lower end of the system water discharge nozzle 46 in the step S10 is defined to be relatively high from the inside bottom and close to the top side of the reaction vessel 2, or higher than the height positions of the nozzles in the step S2, for example. For example, the height h6 is 26 mm. The position (height h5) of the lower end of the overflow suction nozzle 55 is also defined to be a relatively high position. The height h5 is 28 mm, for example. These settings ensure that the overflow from the top side is obviated if the liquid surface should undulate in some degree during the water discharge.

(11) The step S11 is performed using the cleaning liquid suction nozzle 47 and the same way as in the step S1.

(12) The step S12 discharges a prescribed amount of blank-value measurement system water by using the blank-value measurement system water discharge nozzle 48. Since the step S12 discharges the prescribed amount of water, the overflow suction nozzle is dispensed with. In the step S12, the system water is discharged from the lower end of the blank-value measurement system water discharge nozzle 48 positioned at a prescribed height (e.g., 1 mm) from the inside bottom (position Z0) of the reaction vessel 2.

(13) The step S13 takes measurement of the blank absorbance by using the spectrophotometer 18, as described above.

(14) The step S14 is performed using the system water suction nozzle 49 and the same way as in the step S1.

(15) The step S15 performs tip-suction by using a tip-suction mechanism including a suction nozzle (residual water suction nozzle) 50 equipped with the suction tip 56. The publicly known techniques are applicable to the tip-suction mechanism and the step S15. The suction tip 56 is formed of resin or the like into a rectangular solid (block), for example, and includes an internal flow passage for suction. A flow passage of the suction nozzle 50 and the flow passage of the suction tip 56 are connected with each other. An X-direction width and a Y-direction width of the suction tip 56 are slightly smaller than those of the inside wall of the reaction vessel 2. This provides for the formation of a flow passage in a predetermined clearance between the suction tip 56 and the inside wall of the reaction vessel 2 during the tip-suction. The residual liquid in the reaction vessel 2 is efficiently sucked through this flow passage. Even in a case where the liquid remains, for example, at four corners of the inside wall of the reaction vessel 2 as a result of the operations up to the preceding step S14, the residual liquid is sucked by the step S15. Thus, the cleaning and rise are completed to place the reaction vessel 2 in a liquid-free and well-sealed state.

[Effects and Etc.]

As described above, the automatic analyzer according to the first embodiment is adapted to reduce the variability of the cleaning range for the cleaning mechanism so that the blank value measurement and the like are less affected by such variability and that the cleaning performance and the blank value measurement performance can be maintained or enhanced. According to the first embodiment, deterioration or abnormality in blank value measurement can be avoided so that the cleaning effect for the reaction vessel can be substantially equalized irrespective of the variability of the cubic capacities of the individual reaction vessels or flow rate change from one cycle to another.

As described above, the first embodiment provides the characteristic control using the characteristic system water discharge mechanism 400 in the step S8 which is most susceptible to air bubble production and cleaning range variations, out of the successive cleaning steps. The lower end of the system water discharge nozzle 44 is defined to be located at the above-described position Z1. The nozzle located at the position Z1 in the lower part of the reaction vessel is controlled to discharge the system water. This is effective to suppress the undulation of the liquid surface, to uniformize the cleaning range with respect to the height direction and to suppress the air bubble production. Further, the system water discharge nozzle 44 is so controlled as not to move upward till the completion of water discharge, thus permitting the overflow suction nozzle 54 to be retained at the fixed position Z2. This is effective not only to suppress the undulation and the like of the liquid surface but also to uniformize the position to which the system water vertically rises upward, irrespective of the variability from one reaction vessel 2 to another. Even in the event of the air bubble production, the air bubble is efficiently sucked and removed by the overflow suction nozzle 54. Further, the operation of extracting the system water discharge nozzle 44 from the immersion in the cleaning liquid is controlled in accordance with the change in liquid level. By doing so, the dropping or scattering of the liquid adherent to the system water discharge nozzle 44 is prevented so that the liquid surface is stabilized and the liquid overflow and the like can be prevented. That is, the first embodiment is adapted to prevent the deterioration of optical measurement accuracy due to the air bubble and the like. In other words, the first embodiment is adapted to enhance the optical measurement accuracy and the reliability of analysis, thus offering a stable operation of the apparatus.

As a modification of the first embodiment, the reaction vessel cleaning mechanism 17 may be configured such that the individual steps do not share the nozzle, pump and the like but are independently controlled. In this case, the apparatus can achieve higher performance based on a more sophisticated control although the apparatus suffers from disadvantages in terms of downsizing and price reduction of the apparatus.

While the invention has been described in detail based on the embodiments thereof, it is noted that the invention is not limited to the foregoing embodiments but may include a variety of modifications.

LIST OF REFERENCE SIGNS

2: reaction vessel
44: system water discharge nozzle
54: overflow suction nozzle
400: system water discharge mechanism

The invention claimed is:

1. An automatic analyzer equipped with functions to perform optical measurement and reaction vessel cleaning, comprising:
a control unit configured for controlling a sequence including the optical measurement and the reaction vessel cleaning;
a discharge mechanism including a discharge nozzle configured for discharging a liquid into the reaction vessel and operative to vertically move up and down the discharge nozzle and to discharge the liquid; and
an overflow suction mechanism including an overflow suction nozzle configured for sucking an overflow amount of the liquid in the reaction vessel and operative to vertically move up and down the overflow suction nozzle and to suck the overflow amount of liquid, wherein
in a liquid discharge step which is included in the reaction vessel cleaning preceding the optical measurement and which is interposed between a preceding step using a detergent and a succeeding blank value measurement step, the control unit provides control so as to carry out the discharge of the liquid from the discharge nozzle and the suction of the overflow amount of liquid through the overflow suction nozzle when the automatic analyzer is in a first state where a lower end of the discharge nozzle is located at a first position in a heightwise lower part of the reaction vessel by a downward movement of the discharge mechanism and a lower end of the overflow suction nozzle is located at a second position in a heightwise upper part of the reaction vessel by a downward movement of the overflow suction mechanism,
an opening mouth at the lower end of the discharge nozzle has a slant face at a cutting angle of 10 degrees or more, and
the slant face is directed to the overflow suction nozzle as seen from the discharge nozzle.

2. The automatic analyzer according to claim 1, wherein the first position is in a first range from an inside bottom of the reaction vessel to one third of the height of an inside wall of the reaction vessel.

3. The automatic analyzer according to claim 2, wherein when controlling the downward movement, the control unit starts the discharge of the liquid at the point of time when the lower end of the discharge nozzle is in the first range and at a position just before the first position.

4. The automatic analyzer according to claim 1, wherein the second position is a position in vicinity to a top side of the reaction vessel and in a range from the top side of the reaction vessel to 95% of the height of the inside wall of the reaction vessel, or the highest position in all the steps of the reaction vessel cleaning.

5. The automatic analyzer according to claim 1, wherein in the first state, the control unit controls the discharge nozzle so as to discharge a predetermined amount of liquid in a range from 97% to 110% of the cubic capacity of the reaction vessel in order that a surface of the liquid reaches the second position.

6. The automatic analyzer according to claim 1, wherein after stopping the liquid discharge and liquid suction in the first state, the control unit controls the discharge mechanism so as to move upward to extract the lower end of the discharge nozzle from inside of the reaction vessel and controls the suction mechanism so as to move upward to extract the lower end of the overflow suction nozzle from inside of the reaction vessel.

7. The automatic analyzer according to claim 1, wherein when controlling the upward movement, the control unit sets the movement to a first rise speed in a first period until the lower end of the discharge nozzle leaves the surface of the liquid and sets the movement to a higher second rise speed relative to the first rise speed in a second period after the lower end of the discharge nozzle leaves the surface of the liquid.

8. The automatic analyzer according to claim 1, wherein the control unit starts the suction by the overflow suction nozzle after the point of time when the discharge of liquid from the discharge nozzle is started and before the point of time when the surface of the liquid reaches the second position.

9. The automatic analyzer according to claim 1, wherein the discharge nozzle and the overflow suction nozzle are coupled together and are integrally controlled to move.

10. The automatic analyzer according to claim 1, further comprising a disk mechanism on which a plurality of reaction vessels as the reaction vessel are arranged on a circle and rotational operation of which is controlled, wherein
a cleaning mechanism configured for the reaction vessel cleaning is disposed at a predetermined position on the circle of the disk mechanism and a mechanism configured for the optical measurement is disposed at some other position on the circle.

11. The automatic analyzer according to claim 1, further comprising:
a detergent discharge mechanism including a detergent discharge nozzle configured for discharging a detergent into the reaction vessel and operative to vertically move up and down the detergent discharge nozzle and to discharge the detergent; and
a detergent overflow suction mechanism including a detergent overflow suction nozzle configured for sucking an overflow amount of the detergent in the reaction vessel and operative to vertically move up and down the detergent overflow suction nozzle and to suck the overflow amount of detergent, wherein
in a step using the detergent, the control unit provides control so as to carry out the discharge of the detergent from the detergent discharge nozzle and the suction of the overflow amount of detergent through the detergent overflow suction nozzle when the analyzer is in a second state where a lower end of the detergent discharge nozzle is located at a heightwise third position in the reaction vessel by a downward movement of the detergent discharge mechanism and a lower end of the detergent overflow suction nozzle is located at a heightwise fourth position in the reaction vessel by a downward movement of the detergent overflow suction mechanism, and
a height difference between the first position of the discharge nozzle and the second position of the overflow suction nozzle during the liquid discharge in the liquid discharge step is larger than a height difference between the third position of the detergent discharge nozzle and the fourth position of the detergent overflow suction nozzle during the detergent discharge in the step using the detergent.

12. An automatic analysis method for an automatic analyzer equipped with functions to perform optical measurement and reaction vessel cleaning, wherein the automatic analyzer comprises:
- a control unit configured for controlling a sequence including the optical measurement and the reaction vessel cleaning;
- a discharge mechanism including a discharge nozzle configured for discharging a liquid into the reaction vessel and operative to vertically move up and down the discharge nozzle and to discharge the liquid; and
- an overflow suction mechanism including an overflow suction nozzle configured for sucking an overflow amount of the liquid in the reaction vessel and operative to vertically move up and down the overflow suction nozzle and to suck the overflow amount of liquid, and steps performed by the automatic analyzer include:
- a step where the control unit operates in a liquid discharge step included in the reaction vessel cleaning preceding the optical measurement and interposed between a preceding step using a detergent and a succeeding blank value measurement step, so as to establish a first state where a lower end of the discharge nozzle is located at a first position in a heightwise lower part of the reaction vessel by a downward movement of the discharge mechanism and a lower end of the overflow suction nozzle is located at a second position in a heightwise upper part of the reaction vessel by a downward movement of the overflow suction mechanism, and
- a step where the control unit provides control in the first state so as to carry out the discharge of the liquid from the discharge nozzle and the suction of the overflow amount of liquid through the overflow suction nozzle, an opening mouth at the lower end of the discharge nozzle has a slant face at a cutting angle of 10 degrees or more, and the slant face is directed to the overflow suction nozzle as seen from the discharge nozzle.

13. The automatic analysis method according to claim 12, wherein the automatic analyzer comprises:
- a detergent discharge mechanism including a detergent discharge nozzle configured for discharging a detergent into the reaction vessel and operative to vertically move up and down the detergent discharge nozzle and to discharge the detergent, and
- a detergent overflow suction mechanism including a detergent overflow suction nozzle configured for sucking an overflow amount of the detergent in the reaction vessel and operative to vertically move up and down the detergent overflow suction nozzle and to suck the overflow amount of detergent, a step performed by the automatic analyzer includes a step where the control unit provides control so as to carry out the discharge of the detergent from the detergent discharge nozzle and the suction of the overflow amount of detergent through the detergent overflow suction nozzle in a second state where a lower end of the detergent discharge nozzle is located at a heightwise third position in the reaction vessel by the downward movement of the detergent discharge mechanism and a lower end of the detergent overflow suction nozzle is located at a heightwise fourth position in the reaction vessel, and a height difference between the first position of the discharge nozzle and the second position of the overflow suction nozzle during the liquid discharge in the liquid discharge step is larger than a height difference between the third position of the detergent discharge nozzle and the fourth position of the detergent overflow suction nozzle during the detergent discharge in the step using the detergent.

\* \* \* \* \*